United States Patent
Maharshi et al.

(10) Patent No.: US 11,537,027 B2
(45) Date of Patent: Dec. 27, 2022

(54) METHODS AND APPARATUS FOR USING A CONTROLLABLE PHYSICAL LIGHT FILTER AS PART OF AN IMAGE CAPTURE SYSTEM AND FOR PROCESSING CAPTURED IMAGES

(71) Applicant: Blue River Technology Inc., Sunnyvale, CA (US)

(72) Inventors: Atul Maharshi, South Orange, NJ (US); Pablo A Anigstein, Palo Alto, CA (US); Rajiv Laroia, Far Hills, NJ (US)

(73) Assignee: Blue River Technology Inc., Sunnyvale, CA (US)

( * ) Notice: Subject to any disclaimer, the term of this patent is extended or adjusted under 35 U.S.C. 154(b) by 321 days.

(21) Appl. No.: 16/746,872

(22) Filed: Jan. 19, 2020

(65) Prior Publication Data
US 2021/0223664 A1    Jul. 22, 2021

(51) Int. Cl.
*H04N 5/225* (2006.01)
*G03B 11/00* (2021.01)
(Continued)

(52) U.S. Cl.
CPC .............. *G03B 11/00* (2013.01); *G06T 1/20* (2013.01); *G06T 7/20* (2013.01); *H04N 5/23264* (2013.01); *H04N 5/3572* (2013.01)

(58) Field of Classification Search
CPC .................................................. G03B 11/00
See application file for complete search history.

(56) References Cited

U.S. PATENT DOCUMENTS 10,277,842 B1 *  4/2019  Cooper ................. H04N 5/2351
11,032,488 B2 *  6/2021  Hawes .................... G03B 11/02
(Continued)

OTHER PUBLICATIONS

Notification of Transmittal of the International Search Report and the Written Opinion of the International Searching Authority, International Search Report and Written Opinion of the International Searching Authority from PCT/US2021/013838 dated Apr. 16, 2021, 17 pages.
(Continued)

*Primary Examiner* — Gary C Vieaux
(74) *Attorney, Agent, or Firm* — Straub & Straub; Michael P. Straub; Stephen T. Straub

(57) ABSTRACT

Methods and apparatus for using a controllable filter, e.g., an liquid crystal panel, in front of a camera are described. The filter is controlled based on the luminosity of object in a scene being captured by the camera to reduce or eliminate luminosity related image defects such as flaring, blooming or ghosting. Multiple cameras and filters can be used to capture multiple images as part of a depth determination processes where pixel values captured by cameras at different locations are matched to determine the depth, e.g., distance from the camera or camera system to object in the environment. Pixel values are normalized in some embodiments based on the amount of filtering applied to a sensor region and sensor exposure time. The filtering allows for regional sensor exposure control at an individual camera even though the overall exposure time of the pixel sensors may be and often will be the same.

20 Claims, 13 Drawing Sheets

(51) Int. Cl.
*G06T 1/20* (2006.01)
*G06T 7/20* (2017.01)
*H04N 5/232* (2006.01)
*H04N 5/357* (2011.01)

(56) References Cited

U.S. PATENT DOCUMENTS

2014/0307044 A1   10/2014  Sharma et al.
2017/0078550 A1*  3/2017   Terasawa .............. H04N 5/2352
2020/0310013 A1*  10/2020  Gruver ................. G02B 26/023

OTHER PUBLICATIONS

Nayar et al, Adaptive Dynamic Range Imaging: Optical Control of Pixel Exposures Over Space and Time, Proceedings of the Ninth IEEE Internationa Conference on Computer Vision . (ICCV'03), Apr. 2003, pp. 1-8.

Dubbelman et al, Obstacle Detection during Day and Night Conditions using Stereo Vision, Proceedings of the IEEE/RSJ International Conference on Intelligent Robots and Systems, San Diego, CA USA 2007, Oct. 29, 2007 (Oct. 29, 2007), pp. 109-116.

* cited by examiner

| FIGURE 5A |
| FIGURE 5B |

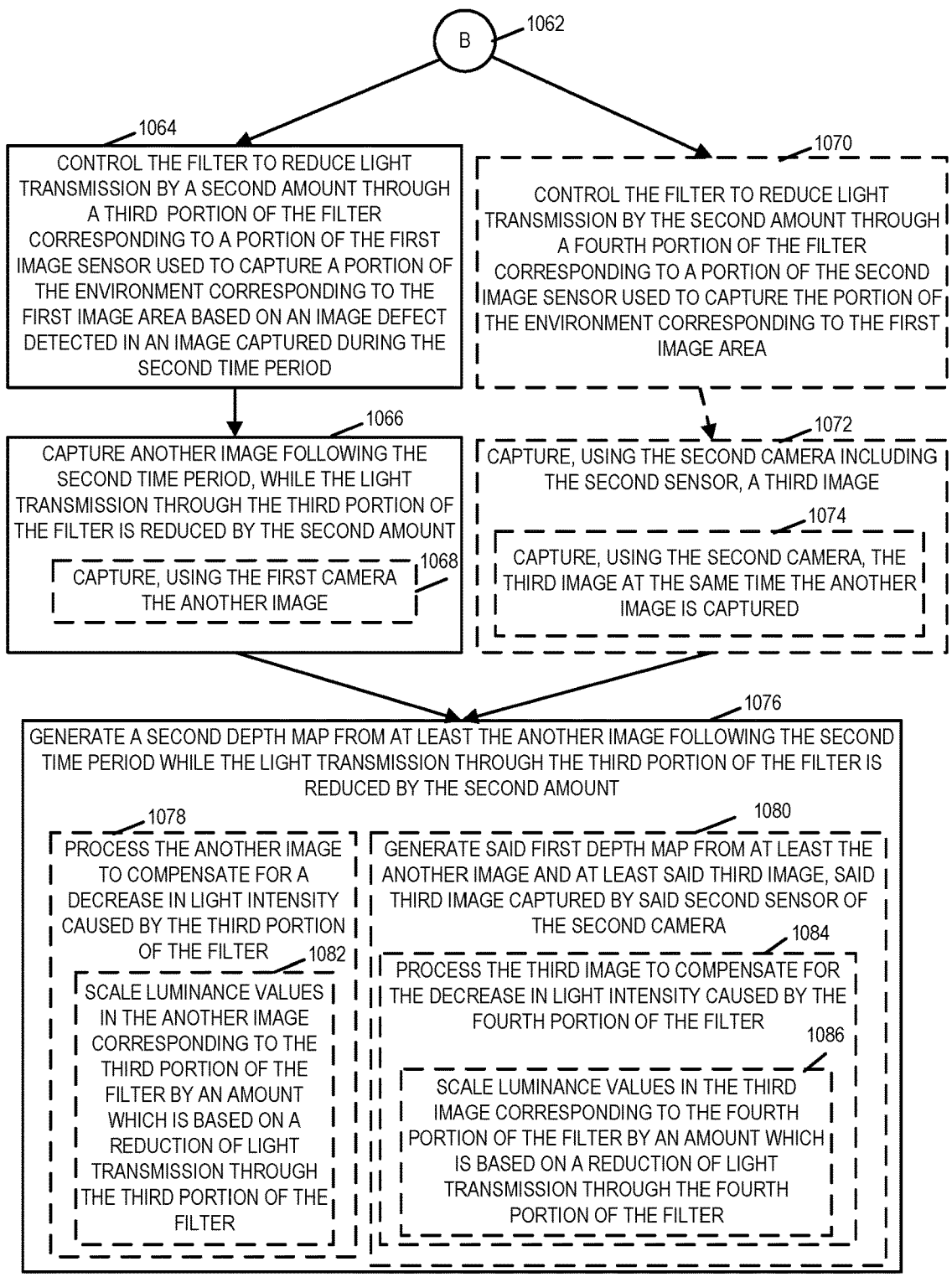

METHODS AND APPARATUS FOR USING A CONTROLLABLE PHYSICAL LIGHT FILTER AS PART OF AN IMAGE CAPTURE SYSTEM AND FOR PROCESSING CAPTURED IMAGES

FIELD

The present application relates to image capture systems and methods for processing captured images to reduce the possibility of image artifacts due to flaring, blooming and/or ghosting while allowing for a large dynamic range and, more particularly, to systems which use a filter, e.g., a LCD (liquid crystal display), to filter all or a portion of a lens area used for image capture.

BACKGROUND

Image capture systems are used in a wide range of applications including vision systems. In many cases it is desirable to support a wide dynamic range with regard to the captured images.

Captured images may be used in a wide variety of applications including, for example depth determination applications. For example multiple images of a scene area, captured form different, can be used to generate depth information, e.g., a 3D map of an environment, for device control purposes or for other reasons. For example, in some systems cameras are used to capture images which are then processed to determine the depth, e.g., distance from the camera or cameras, to the objects in an environment. This allows for determining the 3D shape of the objects in the environment as well as the distance between the image capture system and the objects.

A depth map generated from captured images may support a wide range of applications including control systems applications where depth information is used to control a car, robot, or manufacturing machine for example.

Unfortunately, defects in captured images may result in errors in the generated depth map and/or lack of depth information for portions of a particular portion of an environment. In the case of a control system, such as an automated car driving system, such errors or lack of depth information can present a risk that a control error may be made, e.g., the distance to an object in the environment may not be accurately detected and an accident may result.

Vision systems, which use one or more cameras, have a limited dynamic range which cannot span the full range of many scenes: e.g., scenes in which the sun is directly in view, a street at night with bright lights and/or a road at night with oncoming traffic, e.g., a vehicle with one or two with headlights, e.g., high-beams, on.

Apart from not being able to capture the entire dynamic range of a scene, there are other issues caused by locally intense areas of a scene such as flaring, which can be, and sometimes is, introduced by lens aberrations, and blooming which can be and sometimes is caused by limited capacity of charge accumulating sites on a digital image sensor. Lens flare or flaring refers to a phenomenon wherein light is scattered or flared in a lens system, often in response to a bright light, producing a sometimes undesirable artifact within the image. Flare can manifest itself in two ways: i) as visible artifacts in a captured image and/or ii) as a haze across portions of the image corresponding to the flare. When some cameras take a picture of a very bright object, the light can get so intense that it doesn't just affect one part of the image but the light streaks out from the light source and creates a supernova like effect that can consume or damage the image area surrounding the area where the light source is located in the image.

The aforementioned flaring and blooming artifacts are particularly troubling for a depth perception system which relies on matching pixels between two or more images to determine the depth (3D locations) of objects in a scene. The effect of sensor saturation is particularly problematic since any saturated region may match with another saturated region. Accordingly, saturated image regions, e.g., image regions where the light intensity exceeded the maximum range of the image sensor used to capture the image, should be excluded from participating in the matching step used for depth determination in various depth determination systems.

Potentially worse still for depth determination applications, blooming on the sensor and thus in the captured image, leads to surrounding pixels of a bright area being contaminated with false intensity values. Similar to the case of saturation due to the limited dynamic range of a sensor, false matches can result when making depth determination decisions based on a comparison of pixels of different cameras that are affected by lens flaring. For example, a flared part of the image from a first camera may match another flared region of an image from another camera where, in the absence of flaring, the pixel locations might not have captured the same part of the scene. This can lead to depth errors in the depth map being generated from the image or images including a flare.

Another image defect, sometimes referred to as an artifact, is a light duplicate or "ghost" image of an object appearing at a location in an image where the object does not appear in the environment. Ghosting can be caused by reflections in the optical path of the image capture system, e.g., as may be caused by light bouncing off an inner surface of a car windshield and then being reflected back by the outer surface of the windshield into a camera positioned inside the car.

Various techniques have been designed to enhance the dynamic range of a system, primarily involving the manipulation of sensor integration times. For example, one approach involves capturing the same scene at multiple time instances, e.g., with one image being captured after another, each with different exposure settings. Using "Quad-bayer" like mechanisms, where the value corresponding to a larger pixel is generated based on the values of smaller constituent pixels which have been exposed at differing levels, has also been proposed.

It should be appreciated that trying to capture more of a scene's dynamic range with multiple captures presents difficulties for scenes with significant motion particularly when the images are captured sequentially. In the case of motion the motion may be due to object motion or the camera moving, so in the case of a vehicle capture system objects may appear at different distances from the capture system even if a vehicle is stationary and the object is moving. In the case of using differing exposures for constituent captured pixels which are used to generate a larger pixel of an image, information is still lost in terms of resolution that might otherwise be achieved using the maximum pixel resolution of an image capture device for all purposes. This is because, in some cases in such an approach for a pixel corresponding to a light source that results in sensor saturation, some of the constituent pixels will still be saturated.

Such sensor driven approaches involving multiple image captures or differing exposures unfortunately fail to counter the effects of flaring introduced by a lens system and/or blooming, since pixels that are overexposed are still prone to blooming.

It would be desirable if methods and/or apparatus could be developed which could reduce the risk of flaring, blooming and/or ghosting affecting captured images without necessarily affecting all parts of an image. It would be desirable if methods and/or apparatus could be developed which could address exposure control with regard to some portions of an image sensor without affecting, e.g., reducing, the light entering other portions of the image sensor. While not necessary for all embodiments, it would be desirable if effects of dynamic exposure control on captured images could be communicated to an image processing device and taken into consideration when generating depth maps or performing other post capture image processing operations.

SUMMARY

Various features of the present invention relate to use of a controllable light filter for exposure control purposes. In some embodiments a liquid-crystal (LC) panel is used as the controllable light filter with different portions of the LC panel being controlled to block different amounts of light and thereby provide local exposure control. However, the invention is not limited to LC embodiments and other types of controllable light filters can be used in place of the LC filter depending on the particular embodiment. The LC panel may be and sometimes is a LC display panel (LCD). In various embodiments an LCD is placed in front of one or more camera lenses of an image capture system to act as a filter to reduce flaring, blooming and/or ghosting. The LC panel, in various embodiments, acts as a filter and the darkness level of the LCD is electronically controlled based on analysis of one or more captured images. In this way the dynamic range of cameras can be improved on a regional or even pixel basis based on the detection of one or more artifacts in one or more previously captured images. In various embodiments artifacts are detected in one or more captured images and then the LCD filtering is dynamically controlled to reduce or eliminate the detected artifact in future images, e.g., by adjusting the amount of light blocked by a portion of the LCD in front of a sensor portion which captured the image portion where an artifact was detected.

The fraction of light filtered by a portion of the LCD screen can be taken into consideration when comparing, e.g., matching, pixels based on intensity. Thus the dynamic regional image filtering made possible by the artifact detection and LCD control mechanism need not interfere with the use of the images for further processing, since the LCD filtering information can be communicated to and used by the system that uses the captured images. In some embodiments the system that performs the further processing is a depth map generation system which generates a depth map from captured images.

The dynamic filtering can be quickly controlled and can vary the level of filtering over different portions of an image sensor between image captures. This can greatly reduce or avoid flaring, blooming and/or ghosting artifacts in many if not all captured images.

Numerous additional features and embodiments, and variations are discussed and described in the detailed description which follows.

BRIEF DESCRIPTION OF THE FIGURES

FIG. 10C shows a second part of a flow chart showing the steps of a second exemplary method implemented in accordance with some embodiments of the invention.

FIG. 10 is a diagram which shows how FIGS. 10A, 10B, and 10C can be combined to show a complete flow chart showing the steps of a method implemented in accordance with one exemplary embodiment.

DETAILED DESCRIPTION

Figure 1:
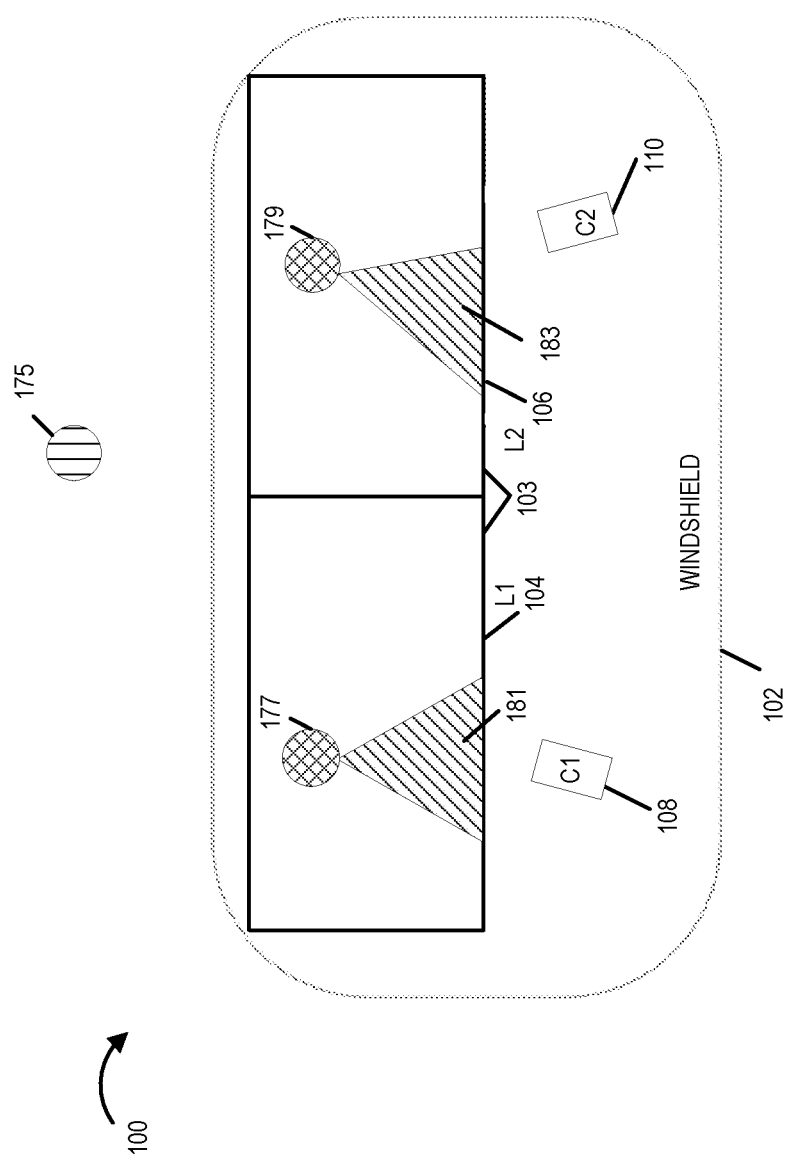
FIG. 1 shows two cameras C1 and C2 mounted behind a windshield with a liquid crystal panel, formed from two liquid-crystal panels L1 and L2, positioned in front of the cameras C1 and C2 but behind a windshield and which can act as a controllable filter in accordance with one embodiment of the present invention.

FIG. 1 includes drawing 100 which shows two cameras C1 108 and C2 110 mounted behind a windshield 102 which also supports a controllable filter 103 which in some embodiments is implemented as a single liquid crystal panel or from multiple, e.g., two liquid-crystal panels, L1 104, that covers the field of view of C1 108, and L2 106 that covers the field of view of C2 110. In the field of view of cameras C1 108 and C2 110 is headlight 175. The cameras C1 108 and C2 110 are at different distances form the headlight 175 resulting in the light form the headlight appearing at different locations in the field of view of each of the cameras. Shaded portion 177 represents the image of the headlight 175 in the field of view of camera C1 while portion 181 represents the illuminated area in the environment corresponding to the beam from headlight 175 within the field of view of camera C1 108. Shaded portion 179 represents the image of the headlight 175 in the field of view of camera C2 110 while portion 183 represents the illuminated area in the environment corresponding to the beam from headlight 175 within the field of view of camera C2 110.

Figure 11:
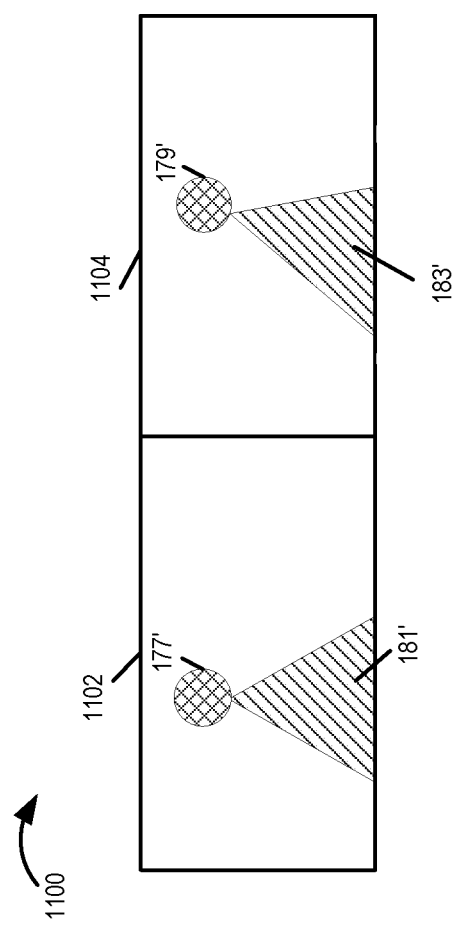
FIG. 11 is a diagram showing a first image captured of an environment captured by camera C1 of FIG. 1 and a second image of the environment captured by camera C2 of FIG. 1.

FIG. 11 illustrates a set 1100 of exemplary images 1102 and 1104 of the environment including the headlight 175 shown in FIG. 1. Image 1102 is captured by camera C1 108, e.g., by the sensor in the camera C1, and includes a headlight portion 177' and headlight beam portion 181' corresponding to the portion of the environment illuminated by the headlight beam of headlight 175. Image 1104 is captured by camera C2 110, e.g., by the sensor in the camera C1, and includes a headlight portion 179' and headlight beam portion 183' corresponding to the portion of the environment illuminated by the headlight beam of headlight 175.

By processing one or both of images 1102, 1104 captured during an image capture time period, as will be discussed below, areas of high illumination 177', 181', 179', 183' can be and are detected. Information about the areas of high illumination, e.g., due to light in the environment, can be and are used in some embodiments to determine which portion or portions of the controllable light filter 103 should be darkened to filter out some of the incoming light during one or more image capture time periods. During image processing of images that are captured while controlled filtering is implemented, the amount of light filtering applied to particular portions of a scene area captured in an image can be taken into consideration and luminance values adjusted accordingly so that the images can be combined or processed for a variety of purposes including depth map generation purposes.

As should be appreciated the areas corresponding to intense headlight illumination may cause saturation of the camera's sensors but in accordance with the invention may be subject to filtering to avoid such a problem. By controlling portions of LC panels 104 and 106, which form filter 103, to selectively filter out some of the light that would otherwise reach the camera if the LC panel 103 was not controlled to filter the high intensity areas, saturation of the camera sensors in areas which would otherwise be subject to high intensity light can be avoided. Shading is used in FIG. 1 to illustrate an exemplary level of filtering. The areas corresponding to circles 177 and 179, e.g., corresponding to the headlights of an oncoming vehicle, may be and sometimes are subject to a greater amount of filtering with more light being blocked than other areas such as areas 181, 183 subject to high illumination from the headlight beams. Other areas of a camera's field of view (FOV) may be and sometimes are not subject to any filtering or a minimum level of filtering such as the road areas which are not highly illuminated. Portions of the filter 103 which are not shaded in the FIG. 1 example, when shading is being implemented, will allow light to pass through at maximum intensity. By using different levels of filtering for different portions of the filter 103 once the intensity of the incoming light is determined, the filtering can be used to compensate for high intensity light and knowledge of the amount of filtering applied to a particular area of the filter and thus corresponding portion of the camera image sensor can be and sometimes is taken into account when processing captured images.

Note that because the cameras are spaced apart from one another in the FIG. 1 implementation, objects in the images captured by cameras 108, 110 will appear at different locations in the images captured by each camera and the particular location of an object in a captured image will be a function of the distance from the camera capturing the image to the object in the image. By using information about the known distance between cameras C1 108 and C2 110 and the direction of the cameras C1 and C2, which provides information about the relationship between the optical axis of each of the cameras, it is possible to compute distance to the objects in the images captured by the cameras C1 and C2. Thus stereoscopic techniques can be used to generate a depth map from images captured by the cameras C1 108 and C2 110 with the controllable filter technique of the invention allowing the images to be captured taking advantage of the dynamic range of the camera sensors and, in most if not all cases, while avoiding saturation of one or more pixels of the camera sensors.

The LC panels 104, 106 of filter 103 are implemented as separate devices in some embodiments but in other embodiments are implemented as different portions of a single LC panel 103. While one or more LC panels are used to implement a controllable filter 103 which can support different, electronically controllable levels of light filtering, other types of controllable optical filters could be used in place of the LCs.

Figure 4:
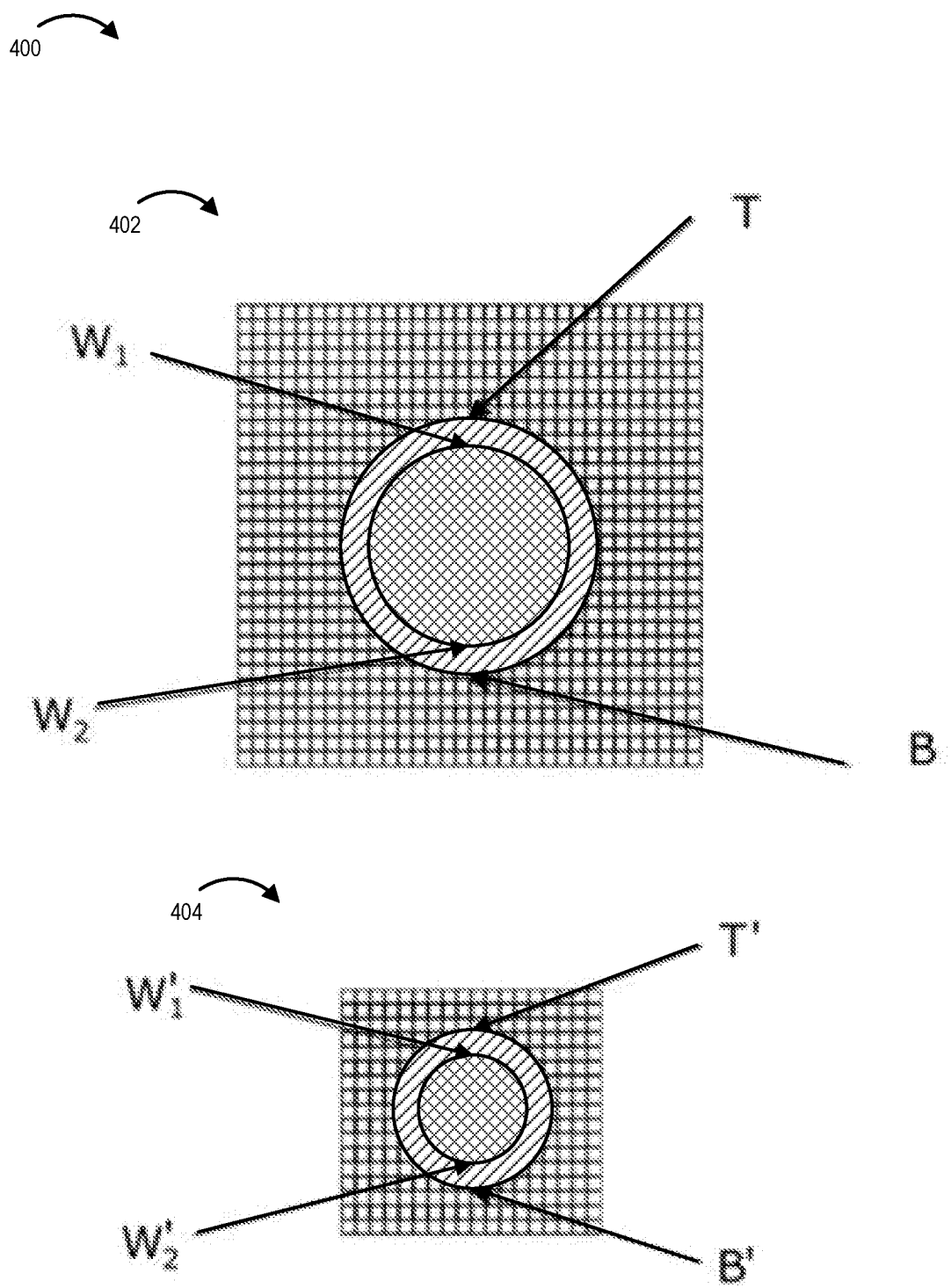
FIG. 4 is a third diagram showing how to identify a region on a LC panel through which light corresponding to an object passes before reaching a corresponding portion of an image sensor.

A controller, such as exemplary control and processing device 604 of FIG. 4 which can be and sometimes is implemented as a processor, controls and synchronizes the cameras and filter components (C1 108, L1 104, C2 110, L2 106) shown in drawing 1000 of FIG. 1 with filtering by the filter 103 being able to be controlled down to the level of an area corresponding to a single pixel or small group of pixels depending on the particular embodiment. While the image capture system shown in FIG. 1 includes multiple cameras C1 and C2 which are well suited for capturing pairs of images from which depth maps can be generated, it should be appreciated that the exposure control techniques can be used with regard to a single camera and that the multiple camera system is exemplary of some embodiments. Furthermore, while explained in the context of a vehicle mounted image capture and processing system, the exposure control method and system which used a controllable filter or filters which allow for individual regions, e.g., zones, to be adjusted separately can be used in a wide range of applications including individual stand alone cameras. Thus it should be appreciated exposure control is, in fact, applicable to a single camera setup. In such an embodiment the controller, e.g., device 602, can be connected to C1 108 and L1 104 and may be implemented in a single case, e.g., as a single camera unit. The pixels on the LC panels (L1 104, L2 106) of filter 103 act as controllable filters can be controlled individually with regard to the amount of light, e.g., portion of incoming light, they allow to pass through. Thus different portions of the filter 103 may and sometimes do block different percentages or fractions of incoming light.

Figure 2:
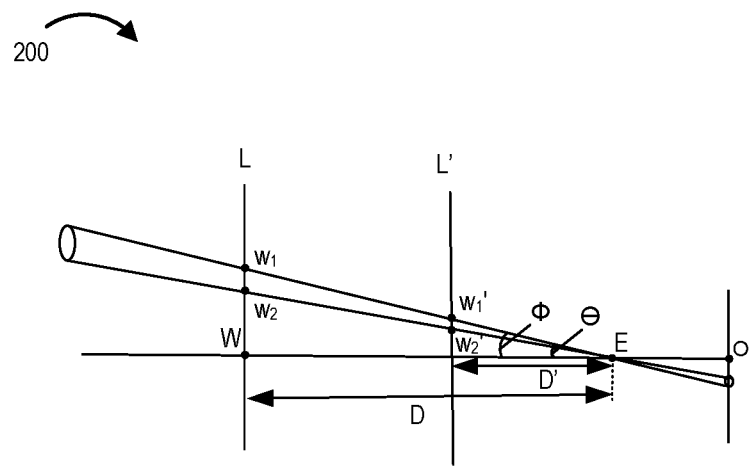
FIG. 2 is a first diagram showing how to identify a region on a LC panel through which light corresponding to an object passes before reaching a corresponding portion of an image sensor.
Figure 3:
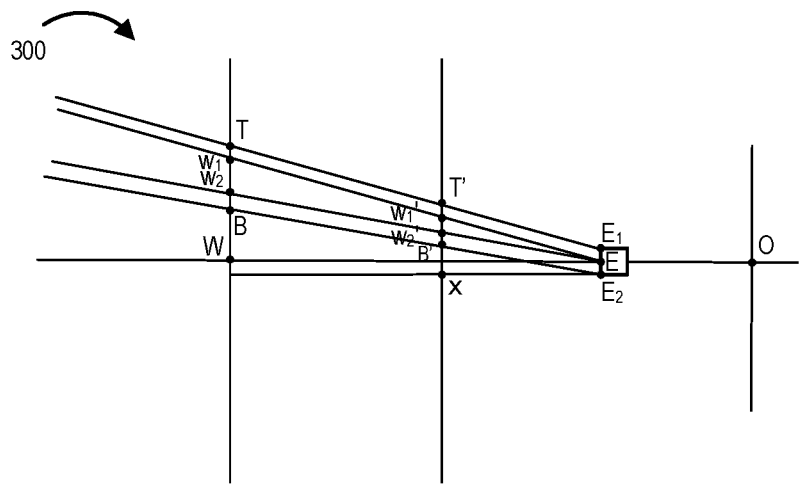
FIG. 3 is a second diagram showing how to identify a region on a LC panel through which light corresponding to an object passes before reaching a corresponding portion of an image sensor.

FIGS. 2 through 4 explain how one can identify a region on the filter 103, e.g., LC panel, corresponding to a region on an image sensor. In FIGS. 2 and 3, a cross-sectional view is used, with the object under consideration being a round light source such as the sun, for purposes of example. It should be appreciated that these figures which help explain the invention are not to scale with the sun being shown as a small round object. The optical axis of a camera capturing the object e.g., light source, image is represented by the line OW. The entrance pupil center which can be interpreted as a corresponding pinhole location is at E. LC panels at two different distances are considered, one (let's call this L) at a distance D from the entrance pupil and the other (let's call this L') at a distance D'. If the entrance pupil were indeed a pinhole, a ray emanating from the top of the sun's disk will pass through L at W1, while one emanating from the bottom of the sun's disk will pass through L at W2. The respective points on L' are W'1 and W'2.

In FIGS. 3 and 4, the effect of a non-zero size of the entrance pupil of a camera is shown. Taking the example of circle passing through W1/W2 in FIG. 4, one finds that when the entrance pupil size is non-zero, the region that affects the image of the sun on the image sensor is in fact the circle with its border passing through points T and B. This can be deduced by looking at FIG. 3, one notices that T is the point of intersection of a ray emanating from the top of the sun's disk that also passes through the top of the entrance pupil with the panel L. Similarly, B is the point of intersection of a ray emanating from the bottom of the sun's disk that also passes through the bottom of the entrance pupil with the panel L.

Notice that the overhead, e.g., the extra region that needs to be controlled to reduce saturation resulting from the sun, for L is proportional to the length of the segment (T,W1) and inversely proportional to the square of the line segment (W1,W2). It can be seen that the line segment (T,W1) has the same length as (T',W'1), while segment (W'1,W'2) is clearly smaller than (W1,W2)—this is because D>>D'. In fact, were the panel to be placed right next to the entrance pupil, the overhead region would cover the entirety of the field of view of the camera—notice in FIG. 4 how the thickness of the overhead region (lighter shade of grey) remains the same, thus making a larger proportion of the FoV as the panel is placed closer to the entrance pupil.

Figure 5A:
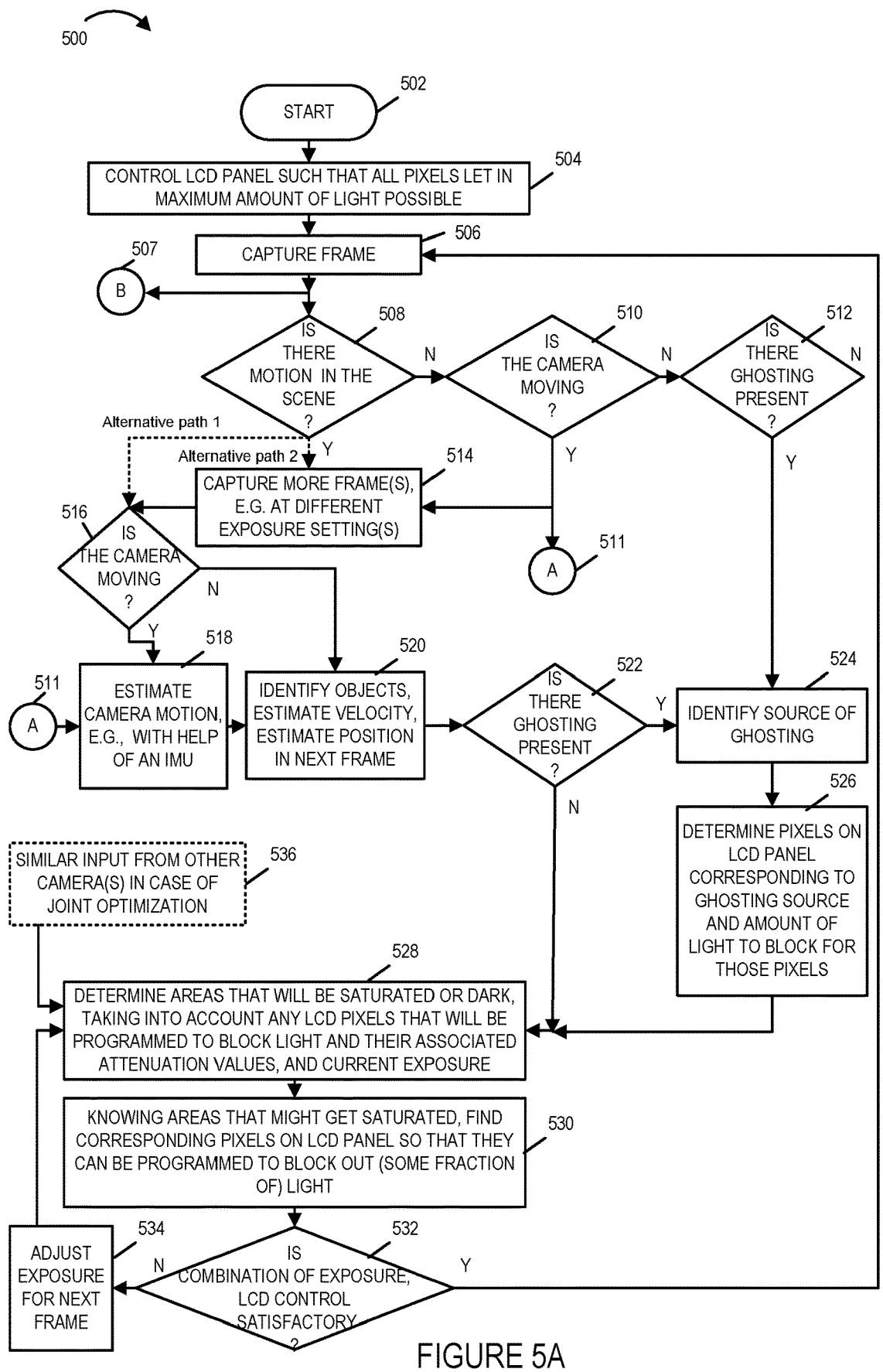
FIG. 5A is a first part a flowchart showing the steps of an exemplary method implemented in accordance with one exemplary embodiment.
Figures 5, 5B:
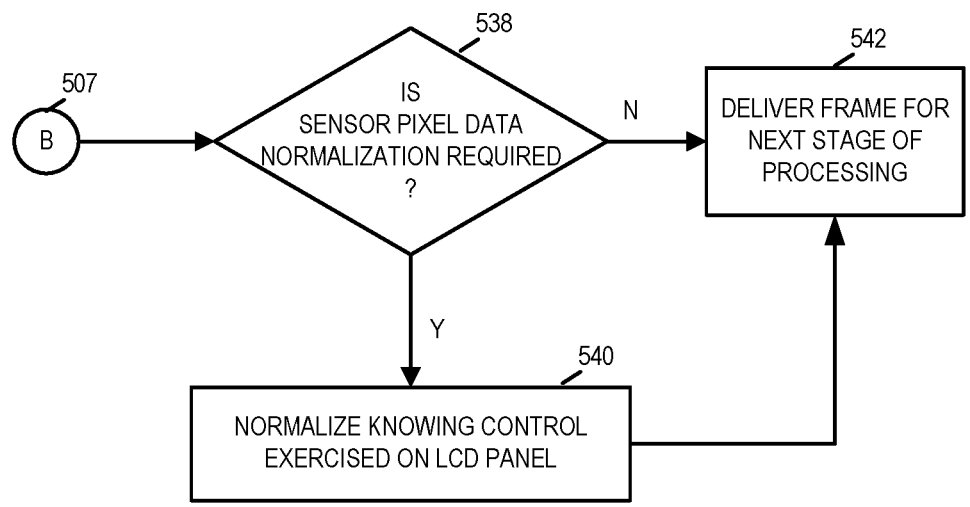
FIG. 5B is a second part a flowchart showing the steps of the exemplary method implemented in accordance with one exemplary embodiment.
FIG. 5 shows how FIGS. 5A and 5B can be combined to form a complete flow chart showing the steps of the exemplary method implemented in accordance with one exemplary embodiment.

FIG. 5, comprising the combination of FIG. 5A and FIG. 5B, is a flowchart 500 showing the steps of an exemplary method in accordance with an exemplary embodiment of the invention. The exemplary flowchart 500 of FIG. 5 shows the flow for a single camera, with a block 536 showing where inputs from another camera would be applicable if desired.

Operation starts in step 502, in which the system, e.g., a system including at least one LC panel, at least one camera, and a control and processing device, is powered on and initialized. Operation proceeds from step 502 to step 504. In step 504 the control device, e.g., device 604, controls an LCD panel, e.g., LC panel 1 104, such that each of the pixels in the LCD panel let in (let through) the maximum amount of light possible. Operation proceeds from step 504 to step 506 and via connecting node B 507 to step 538.

In step 506 the control device controls the camera, e.g., camera 1 108, to capture a frame. For example, in step 506, control device 604 controls camera C1 108 to capture, via sensor S1 606, light which has passed through windshield 102 and LC panel 1 104 and entered camera C1 108 via opening 610.

Operation proceeds from step 506 to step 508. In step 508, a determination is made as to whether or not there is motion in the scene corresponding to the captured frame. The motion may be and sometimes is made by comparing the captured frame to an earlier captured frame to determine if an object in the captured frames has moved. If the determination of step 508 is that there is motion in the scene, then operation proceeds from step 508 to step 514 or alternative to step 516, e.g., depending upon the implemented embodiment. If the determination of step 508 is that there is not motion in the scene, then operation proceeds from step 508 to step 510

Returning to step 514, in step 514 the camera is operated to capture more frame(s), e.g., at different exposure setting(s). In this way images corresponding to different luminance dynamic ranges are captured and can be used to facilitate detection of defects, also sometimes referred to as artifacts, in captured images and/or to facilitate camera or object motion. Operation proceeds from step 514 to step 516.

In step 516, a determination is made as to whether or not the camera is moving. If the determination of step 516 is that the camera is moving then operation proceeds from step 516 to step 518. However, if the determination of step 516 is that the camera is not moving, then operation proceeds from step 516 to step 520.

In step 518, camera motion is estimated, e.g., with help of an inertial measurement unit (IMU), e.g., an IMU including 3 gyroscopes and 3 accelerometers. In some embodiments, the IMU is an IMU chip included in the camera. In some embodiments, the IMU is a device which is external to the camera but included in the vehicle 602 in which the camera is located and is mounted at a known offset position and orientation with respect to the camera. Operation proceeds from step 518 to step 520.

In step 520 objects are identified, velocity is estimated, and position is estimated for the next frame. Object identification is used for prediction of the pixel values in the next frame (knowing of course, the exposure settings on the sensor and the LCD pixel values) especially in the presence of scene motion. For example, if a headlight of moving car is identified and the car's orientation and velocity are available, where the headlight would be likely to be seen in the next frame, can be, and sometimes is, predicted, and the corresponding LCD pixel values are adjusted accordingly, e.g., to filter out some of the light from the headlights and keep the captured pixel values corresponding to the headlights within the dynamic range of the sensor. Operation proceeds from step 520 to step 522.

In step 522 a determination is made as to whether or not ghosting is present. Determining ghosting, in some embodiments, involves knowing and using the optical characteristics of the system. The brighter areas within a scene are looked at, and knowing the optical characteristics and object position, a determination is made as to whether or not the brighter areas appear superimposed (i.e. ghosted) on surrounding regions. Sources of ghosting, e.g., a light in a scene, will be brighter in the image than the ghosts themselves since the ghosts are due to reflections which receive only a small portion of the original received light corresponding to the object causing the ghost image in a captured image of a scene area. Knowing the angles of incidence and lens characteristics and then testing if areas in the shape of the brighter regions superimposed in surrounding areas are detected, is used to identify the ghosting sources in some embodiments. If the determination of step 522 is that ghosting is present, then operation proceeds from step 522 to step 524. However, if the determination of step 522 is that ghosting is not present, then operation proceeds from step 522 to step 528.

Returning to step 510, in step 510 a determination is made as to whether or not the camera is moving. If the determination of step 510 is that the camera is moving, then operation proceeds from step 510 to step 514 or via connecting node A 511 to step 518, depending upon the particular embodiment. If the determination of step 510 is that the camera is not moving, then operation proceeds from step 510 to step 512.

In step 512 a determination is made as to whether or not ghosting is present. If the scene and camera are static, in some embodiments, ghosting is determined using the following method. The LCD pixels values are set (e.g., controlled) to block out light corresponding to all the saturated pixels in the scene. Later, if it is discovered that some of the blocked areas are darker than expected, ghosting is likely because these areas were in fact ghosts and since we had blocked out the original source of ghosting, we need not have blocked light corresponding to these ghosts. If the determination is that ghosting is present, then operation proceeds from step 512 to step 524.

In step 524 the source of the ghosting is identified. Operation proceeds from step 524 to step 526. In step 526 pixels on the LCD panel corresponding to the ghosting sources are determined and a determination is made as to the amount of light to block for those pixels. The amount of light to block depends on the strength of the "ghost" in the captured image with the amount of light being block being greater when a strong, i.e., highly visible, ghost is detected than when a weaker less visible ghost is detected. Sufficient light is blocked with respect to the source of the ghost to render the ghost unnoticeable to a human viewer of the captured image in some embodiments. Operation proceeds from step 526 to step 528.

In step 528 areas of captured images, and thus sensor pixel elements which generate pixel values corresponding to those areas, are determined that will be saturated or dark, taking into account any LCD pixels that will be programmed to block light and their associated attenuation values, and current exposure. Operation proceeds from strep 528 to step 530.

In step 530, knowing areas that might get saturated, corresponding pixels on the LCD panel are found, so that those corresponding pixels on the LCD panel can be programmed to block out, i.e., reduce, some fraction of light reaching the pixels of the sensor which generate pixel values of a captured image. Operation proceeds from step 530 to step 532.

In step 532 a determination is made as to whether or not the combination of exposure, LC panel control is satisfactory. Exposure control on the sensor is global to a frame, while LCD control is implemented a local level, e.g., with different regions of the sensor being subject to different levels of light filtering via control of the LC panel to reduce the amount of light reaching some portions, e.g., regions or areas of a sensor. The rate of light reduction by the LCD for a given region of the sensor is controlled and the light reduction factor is available and used for post capture image processing in some embodiments, e.g., during depth map generation from captured images. If it is determined that there are too many pixels on the sensor that are dark despite the LCD pixels being fully "open" and passing the maximum amount of light, then the SNR on these pixels can be, and sometimes is increased, by increasing the exposure (e.g., up to a certain maximum dictated by other system requirements, e.g., how much motion blur is to be tolerated for an intended application). However, since exposure control on the sensor is global, this means that there may be other pixels that may become prone to saturation. For these pixels, the LCD regions corresponding to the pixels likely to saturate is maximized in terms of light filtering to reduce the risk of saturation.

Determination of whether or not exposure can be implemented in a complicated or simplistic manner depending on the particular embodiment. In some embodiments, simple dark/bright thresholds are used to control exposure. In some other embodiments, instead of simple dark/bright thresholds, a histogram of sensor pixel values (given LCD pixel values) is computed such that a pixel's contribution to a bin is weighted a function of the object that the pixel belongs to, and then exposure is controlled so that a weighted function of the histogram (note that in some embodiments these weights are dependent on the histogram bin location) is maximized.

If the determination of step 532 is that the combination of exposure and LCD control is satisfactory, then operation proceeds from step 532 to step 506; otherwise, operation proceeds from step 532 to step 534.

In step 534 the exposure is adjusted for the next frame. Operation proceeds from step 534 to step 528.

In step 528 a determination is made as to whether or not sensor pixel data normalization is required. If the determination is that sensor pixel normalization is required, then operation proceeds from step 538 to step 540; otherwise, operation proceeds from step 538 to step 542.

In step 540 the sensor pixel data is normalized, in view of the known control, e.g., darkling of one or more regions, exercised on the LCD panel. Operation proceeds from step 540 to step 542. In step 542 the frame is delivered for the next stage of processing. The normalization of pixel values based on the amount of LCD filtering is a post capture processing operation which can be and sometimes is performed as part of a set of post-capture image processing operations implemented as part of generating a depth map or combining images depending on the particular exemplary embodiment.

While the method of FIG. 5 is described in the context of being applied to a single camera, the method can be implemented for multiple cameras with the LC panel in front of each camera being controlled in parallel on a per camera basis.

Figure 6:
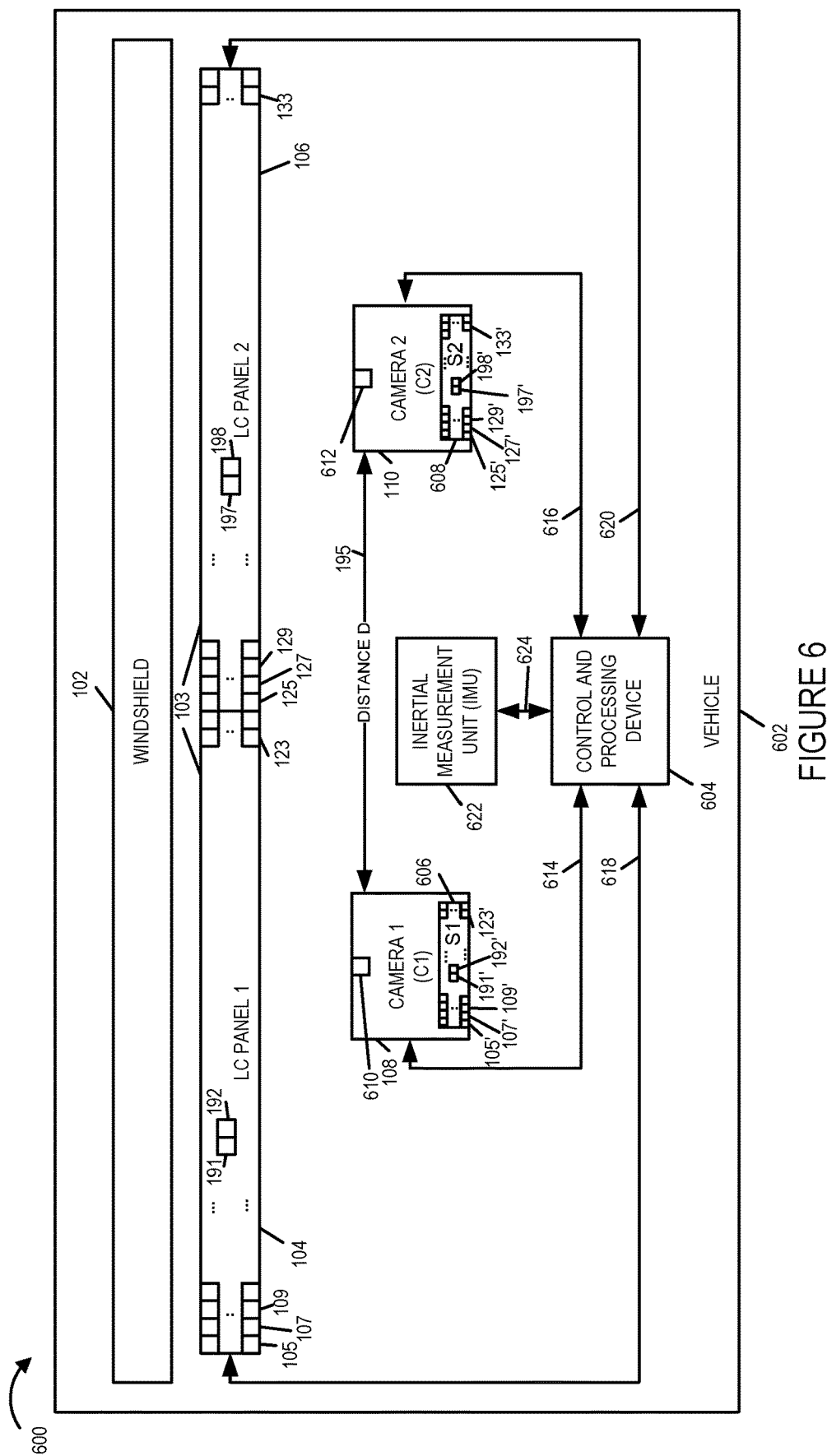
FIG. 6 is a drawing of an exemplary system, e.g., motor vehicle, including a windshield, filter e.g., comprised of a first liquid crystal (LC) panel and a second liquid crystal (LC) panel, a first camera, a second camera, a control and processing device, e.g., a controller, and an inertial measurement unit (IMU) in accordance with one exemplary embodiment.

FIG. 6 is a drawing 600 of an exemplary vehicle 602, e.g., a car, including a windshield 102, liquid crystal (LC) panel 103 which includes LC panel 1 104 and liquid crystal (LC) panel 2 106, a first camera 1 (C1) 108, a second camera 2 (C2) 110, a control and processing device 604, e.g., a microcontroller or central processor, and an inertial measurement unit (IMU) 622. The first and second cameras 108, 110 are a distance D 195 apart. The LCPs 104, 106 can be implemented as physically separate devices or as different portions of a single large LC panel 103. The LC panels 103, 104, 106 can be and sometimes are secured or bonded to the windshield, e.g., with clear adhesive or via mechanical fasteners such as screws or clips, with the cameras 108, 110 being mounted behind the LC panels 104, 106 so that light entering a camera aperture or lens and being directed to the camera's sensor is filtered by the corresponding LC panel prior to entering the camera. A distance may be and sometimes is intentionally kept between the LC panels and the sensors so that the area of the LC panels. Camera 1 108 includes an opening 610 through which light can pass and a sensor S 1 606. The opening 610, which is an aperture, and sometimes includes a camera lens. Accordingly, number 610 is sometimes used interchangeably to refer to a lens or an aperture through which light can enter camera C1. Camera 2 110 includes an opening 612 and a sensor S2 608 and the opening, e.g., aperture, of the second camera 110 may and sometimes does include a lens through which light passes.

In the FIG. 6 example controllable LC panel portions are represented by squares with sensor portions used to capture one or more pixels also being represented by squares. Dots are used to illustrate that while a limited number of sensor panel portions and sensor pixel elements are shown, each panel is formed from an array of controllable portions and each sensor includes an array of pixel elements for capturing light.

In FIG. 6, LC panel elements 105, 107, 109 and 123 of LC panel 1 104 correspond to sensor portions 105', 107', 109' and 123' respectively. LC panel elements 125, 127, 129 and 133 of LC panel 2 106 correspond to sensor portions 125', 127', 129' and 133' respectively.

Light, e.g., lights rays, entering opening 610 of camera C1 108 will have passed through windshield 102 and LC panel 1 104 before reaching sensor 606. Light, e.g., lights rays, entering opening 612 of camera C2 110 will have passed through windshield 102 and LC panel 2 106.

In the example, controllable portions 105, 107, 109, 123 of LC panel 104 will filter light before the light reaches sensor portions 105', 107', 109' and 123' respectively. Similarly controllable filter portion 191 will filter light that passes through the filter 103 and reaches sensor portion 191'. Controllable filter portion 192 will filter light that passes through the filter 103 and reaches sensor portion 192'. Controllable filter portion 197 will filter light that passes through the filter 103 and reaches sensor portion 197' and controllable filter portion 198 will filter light that passes through the filter 103 and reaches sensor portion 198'.

Thus, for example, by controlling how dark LCP portion 105 is, it is possible to control how much light is filtered, e.g., the portion of received light that is blocked, before reaching sensor portion 105'. Similarly LCP portion 107 can be used to filter light reaching corresponding sensor portion 107' and so on. As should be appreciated the LC panel portion (indicated by a reference number) corresponding to a particular sensor portion (indicated with the same number but with a' after the number) can be controlled to control the amount of filtering, and thus portion of received light, that will reach a portion of the sensor used to capture an image. As should be appreciated each LCP portion corresponds to a sensor portion and each sensor portion corresponds to a portion of the environment that is in the field of view of the camera through the LCP and windshield. Thus an image of the environment captured by sensor portions 105', 107', 109' will have been subject to a controllable known amount of filtering applied by LCD portions 105, 107 and 109, respectively. Sensor portions 105', 107', 109' may be and sometimes are a single pixel of the sensor and thus captured image. However, in other embodiments sensor portions 105', 107', 109', 123' correspond to multiple pixel elements of the sensor and thus multiple pixels of a captured image.

Consider for example if filter portion 191 corresponds to a sensor portion 191' which captures an image portion which is determined to have a defect, e.g., from receiving too much light from headlight 175. Filter portion 191 can be, and in some cases will be darkened, to reduce the amount of light directed towards the sensor 606 and hopefully avoid the defect in a subsequent image taken while the filter is active in filter portion 191. As the source of light causing the defect moves from left to right in the field of view, the object, e.g., headlight motion, can be taken into consideration and the filter portion that is active changed form portion 191 to 192 thereby avoiding a defect in an image captured by sensor portion 192'. Similarly, filter portions 197 and 198 can be controlled based on detected image defects or motion of a light source causing an image defect to avoid or reduce defects in image portions, e.g., image pixels represented by pixel values captured by corresponding sensor portions 197', 198'.

Control and processing device 604 is coupled to LC panel 1 104 via communications link 618. Control and processing device 604 is coupled to camera 1 (C1) 108 via communications link 614. Control and processing device 604 is coupled to LC panel 2 106 via communications link 620. Control and processing device 604 is coupled to camera 2 (C2) 110 via communications link 616. IMU 622 is coupled to control and processing device 604 via communications link 624. The control and processing unit 604 controls the LC panels 104, 106 and cameras 108, 110 to operate as discussed in FIG. 5 and in some embodiments performs post capture image processing to generate one or more depth maps from captured images which are then used by the control and processing device to control vehicle operation, e.g., vehicle braking, as part of a collision avoidance system.

Figure 7:
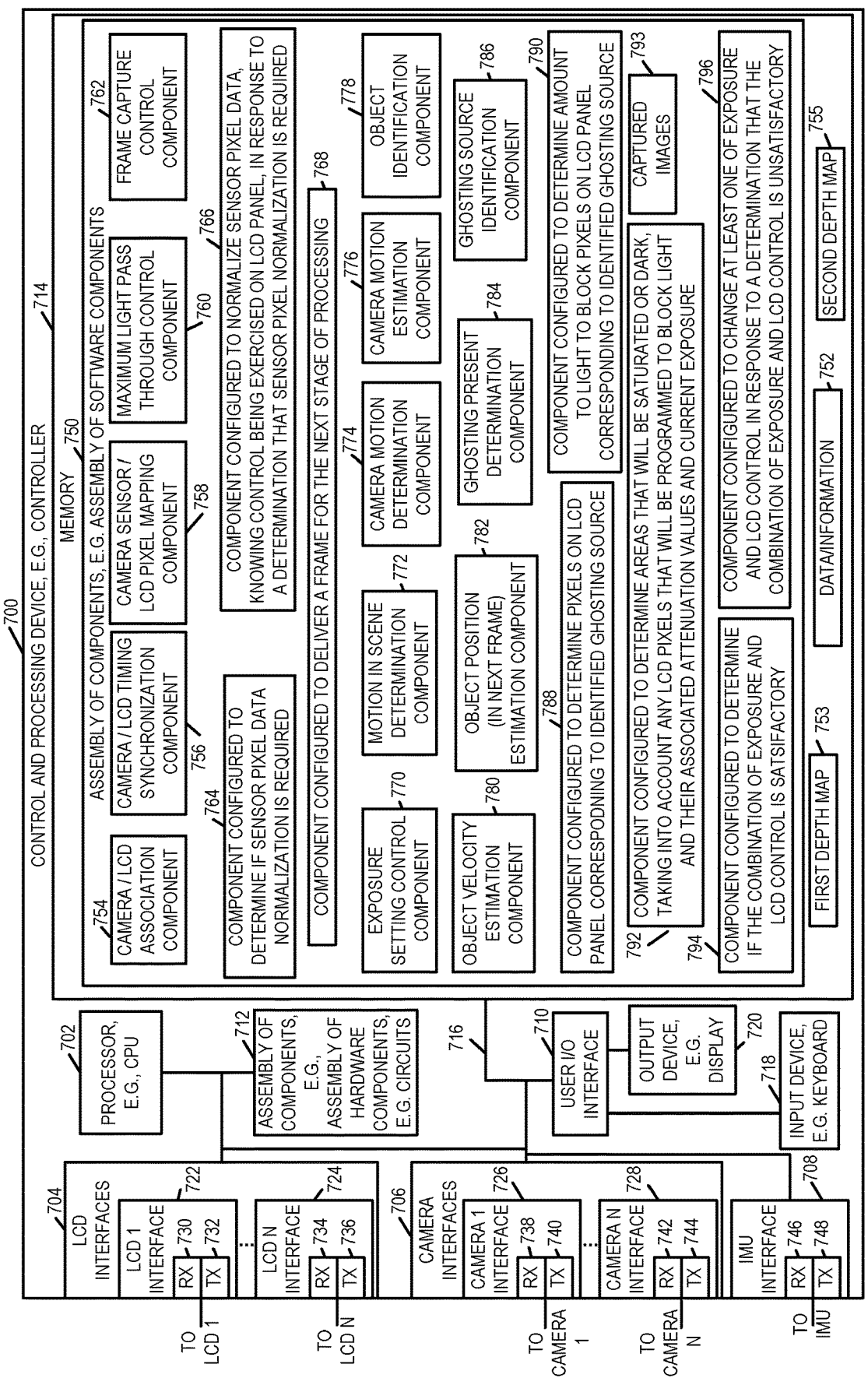
FIG. 7 is a drawing of an exemplary control and processing device that can be used in any of the other embodiments shown in the application including the exemplary embodiment shown in FIG. 6.

FIG. 7 is a drawing of an exemplary control and processing device 700, e.g., a controller, in accordance with an exemplary embodiment. Control and processing device 700 is, e.g. a control and processing device implementing steps of the method of flowchart 500 of FIG. 5 and/or control and processing device 604 of FIG. 6.

Control and processing device 700 includes a processor 702, e.g., a CPU, LCD interfaces 704, camera interfaces 706, an IMU interface 708, a user I/O interface 710, an assembly of components 712, e.g. an assembly of hardware components, e.g., circuits, and memory 714 coupled together via a bus 716 over which the various elements may interchange data and information. Control and processing device further includes an input device 718, e.g. a keyboard, and an output device 720, e.g. a display, coupled to the user I/O interface 710.

LCD interfaces 704 includes a plurality of LCD interfaces (LCD 1 interface 722, . . . LCD N interface 724). Camera interface 706 includes a plurality of camera interface (camera 1 interface 726, . . . , camera N interface 728). LCD 1 interface 722 includes a receiver 730 and a transmitter 732. LCD N interface 724 includes a receiver 734 and a transmitter 736. Camera 1 interface 726 includes a receiver 738 and a transmitter 740. Camera N interface 728 includes a receiver 742 and a transmitter 744. IMU interface 708 includes a receiver 746 and a transmitter 748.

Memory 714 includes an assembly of components 750, e.g., an assembly of software components, and data/information 752. In some embodiments the memory 714 also stores captured images 793, a first depth map 753 that may be and sometimes is generated from captured images and a second depth map 755, e.g., generated from images captured at a different time than the images used to generate the first depth map 753. The first and second depth maps may and sometimes do correspond to changes in distance resulting from vehicle motion of a vehicle 602 which includes the assembly shown in FIG. 1. The captured images 793 may and sometimes do include multiple images captured by the first and second cameras 108, 110 at different times. Assembly of components 750 includes a camera/LCD association component 754, a camera/LCD timing synchronization component 756, a camera sensor/LCD pixel mapping component 758, a maximum light pass through control component 760, a frame capture control component 762, a component 764 configured to determine if sensor pixel data normalization is required, a component 766 configured to normal sensor pixel data, knowing control being exercised on the LCD panel, in response to a determination that sensor pixel normalization is required, a component 768 configured to deliver a frame for the next stage of processing, an exposure setting control component 770, a motion in scene determination component 772, a camera motion determination component 774, a camera motion estimation component 776, an object identification component 778, an object velocity estimation component 780, and an object position (in next frame) estimation component 782. Assembly of components 750 further includes a ghosting present determination component 784, a ghosting source identification component 786, a component 788 configured to determine pixels on the LCD panel corresponding to an identified ghosting source, a component 790 configured to determine the amount of light to block pixels on the LCD panel corresponding to the identified ghosting source, a component 792 configured to determine area that will be saturated or dark, taking into account any LCD pixels that will be programmed to block light and their associated attenuation values and current exposure, a component 794 configured to determine if the combination of exposure and LCD control is satisfactory and a component 796 configured to change at least one or exposure and LCD control in response to a determination that the combination of exposure and LCD control is unsatisfactory.

Figure 8:
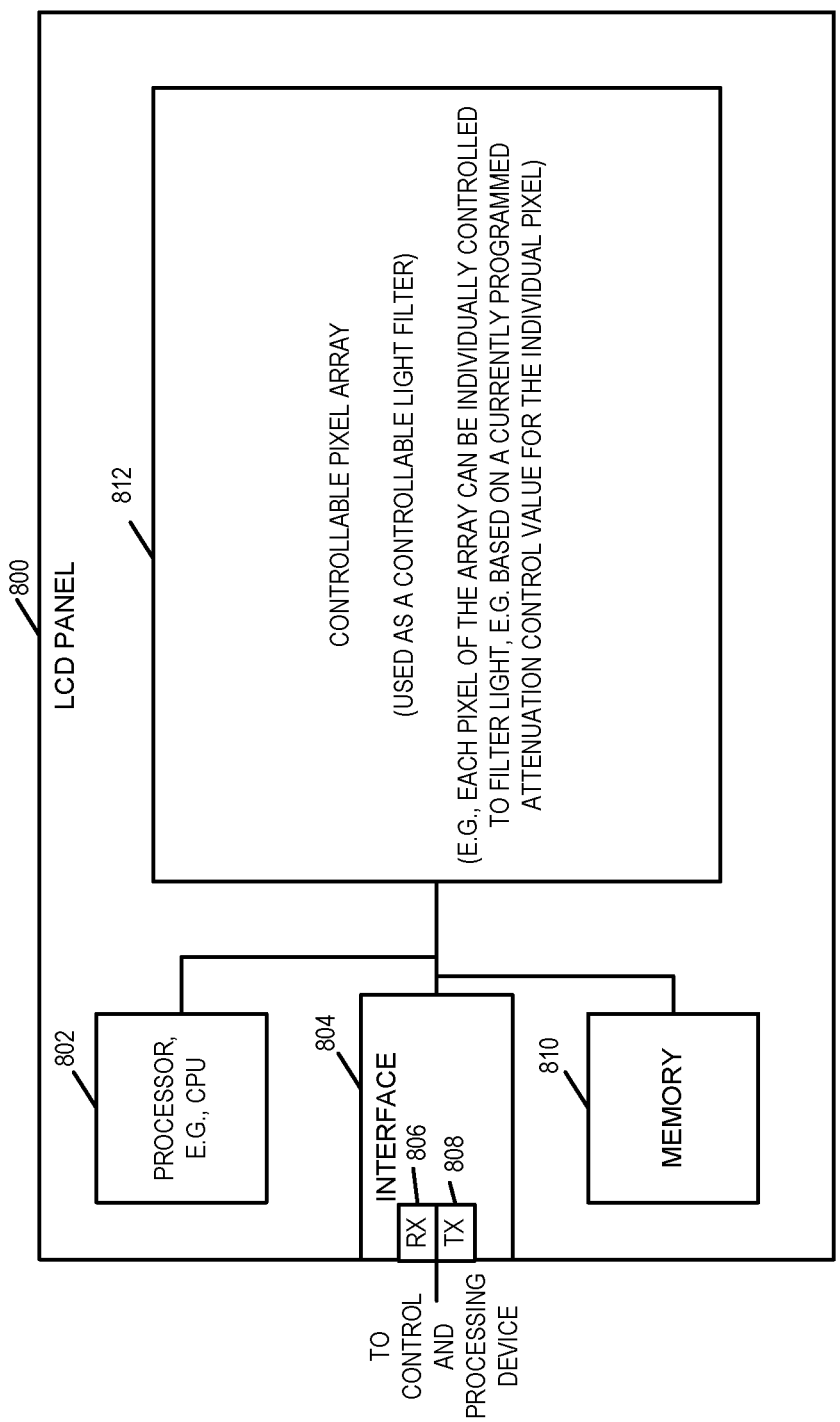
FIG. 8 is a drawing of an exemplary controllable light filter, e.g., LCD that can be used as the controllable filter shown in any of the other figures and embodiments.

FIG. 8 is a drawing of an LC panel 800 in accordance with an exemplary embodiment. The LC panel in some embodiments is an LC display (LCD) which is controlled to darken some areas as light passes through the LCD 800. LCD 800 can and sometime sis used as any one of the LC panels shown in the other figures, e.g., LC panel 1 104 or LC panel 2 106 of FIG. 1 or 6 and/or a LCD used in implementing steps of the method of flowchart 500 of FIG. 5. The LCD panel 800 includes a processor 802, an interface including a receive circuit 804 and a transmit circuit 808, a memory 810 and a controllable pixel array which is controlled in accordance with the invention to alter the level of transparency of portion of the controllable pixel array covering corresponding pixel(s) of a camera image sensor. The LCP panel 800 received command via the interface to alter the light transmission capacity of various regions of the LCD panel and impalements the command under control of the processor 802.

Figure 9:
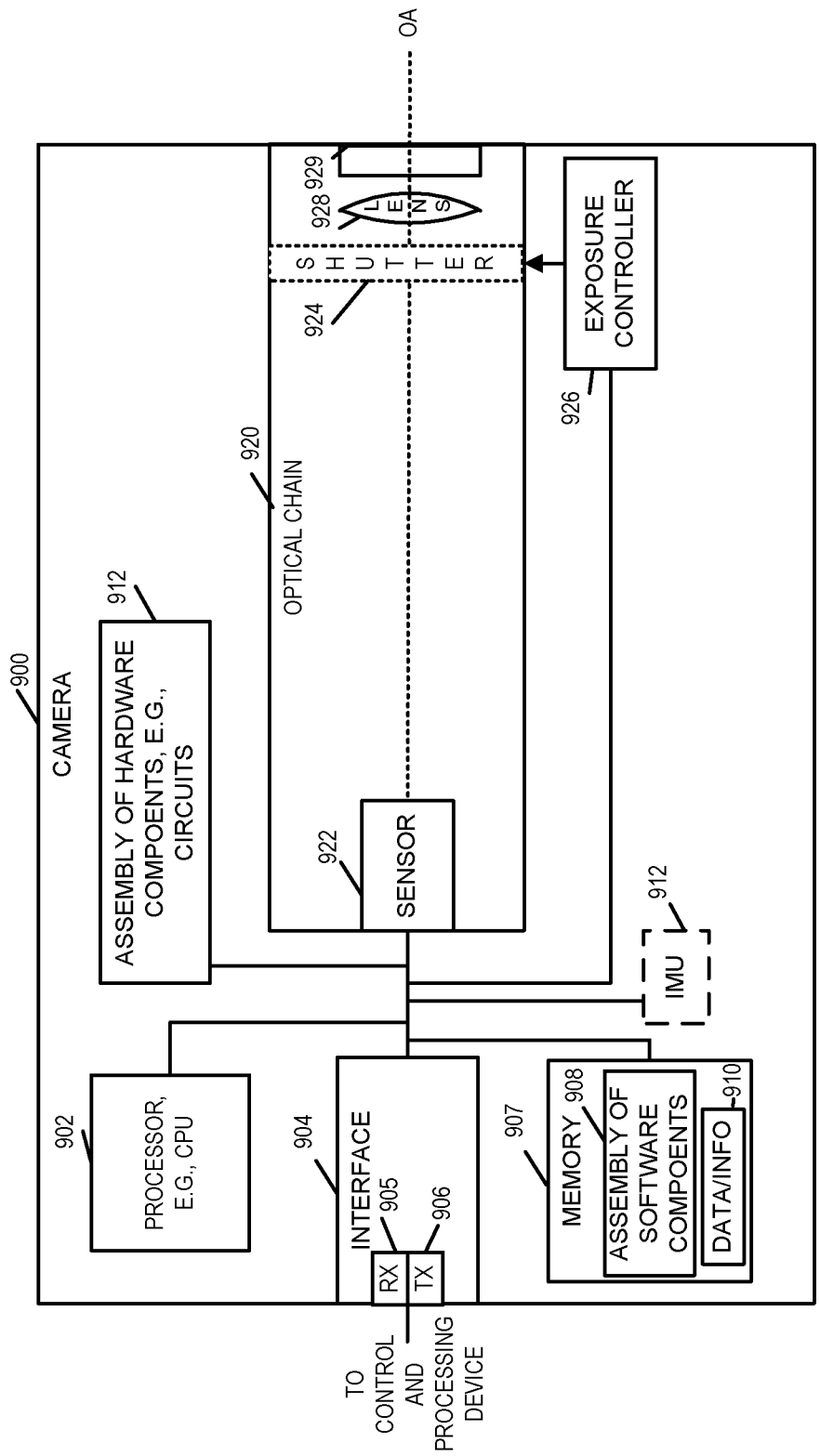
FIG. 9 is a drawing of an exemplary camera in accordance with an exemplary embodiment that can be used as the camera used in any of the other figures and/or exemplary embodiments.

FIG. 9 is a drawing of an exemplary camera 900 in accordance with an exemplary embodiment. Exemplary camera 900 can be and sometime is used as one or the cameras C1 108 or C2 110 of FIGS. 1 and 6 and/or a camera implementing steps of the method of flowchart 500 of FIG. 5.

The camera 900 includes a processor 902, interface 904 including a receive circuit 905 and transmit circuit 906, a memory 907 including an assembly of software components and data/information 910, optionally an internal measurement unit 912, an assembly of hardware components 912 and an optical chain 921 which is coupled to a exposure controller 926. The optical chain 920 includes an image sensor for capturing pixel values as a function of the light intensity to which the sensor pixel elements are exposed, an optional shutter 924 which is not present in various rolling shutter camera embodiments, a lens or lenses 928 and an aperture 929 through which light enters the optical chain 920. The horizontal dashed line 925 represents the optical axis of the optical chain 920.

The processor 902 controls the camera 900 to capture images and control overall exposure under the direction of a control and processing device, such as controller 604 shown in FIG. 6. Exposure control is implemented either by controlling sensor integration and readout of pixel values as in the case of a rolling shutter embodiment or by controlling how long shutter 924 is controlled to remain open in a case where a physical shutter is used for shutter control. Exposure control 926 is shown attached to the sensor 922 as well as the shutter 924 since, depending on the embodiment, one or both of the sensor and shutter are controlled to achieve the desired per image exposure duration. The IMU 912 when included, provides motion information to the system controller 604 facilitating the ability of the system controller to determine when and how the camera 900 is moving, e.g., as the vehicle 602 in which the camera is mounted moves.

While the camera based exposure control can be and is used to control an overall exposure time of the image sensor 922 as discussed above an external LC panel is used to provide a level of regional filtering to different regions through which light passes in the optical chain and thus allows for regional and even pixel level filtering to be applied to the pixel elements of the sensor 922 in a controllable manner, e.g., under the direction of controller 604.

Figure 10A:
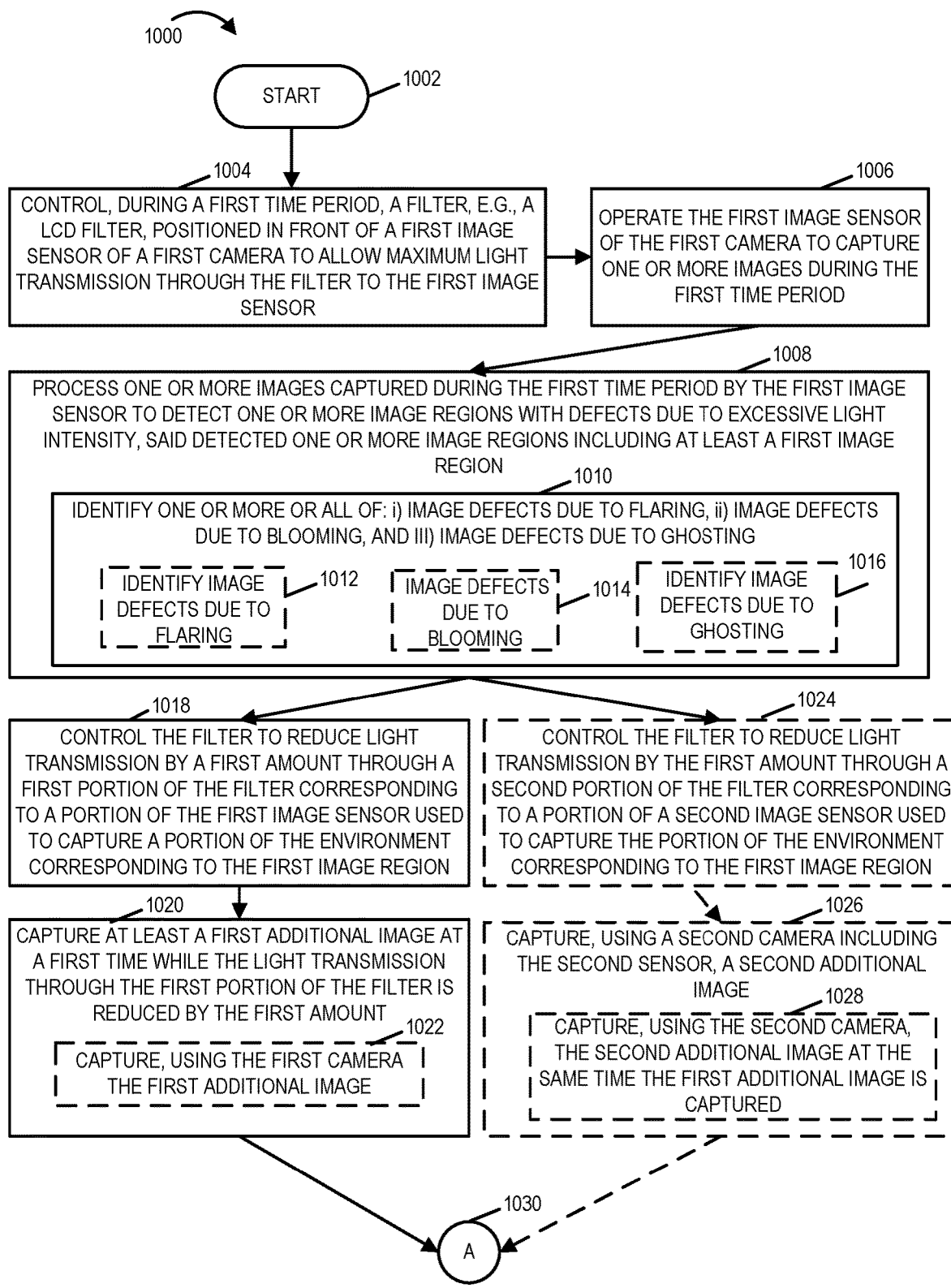
FIG. 10A shows a first part of a flow chart showing the steps of a second exemplary method implemented in accordance with some embodiments of the invention.
Figure 10B:
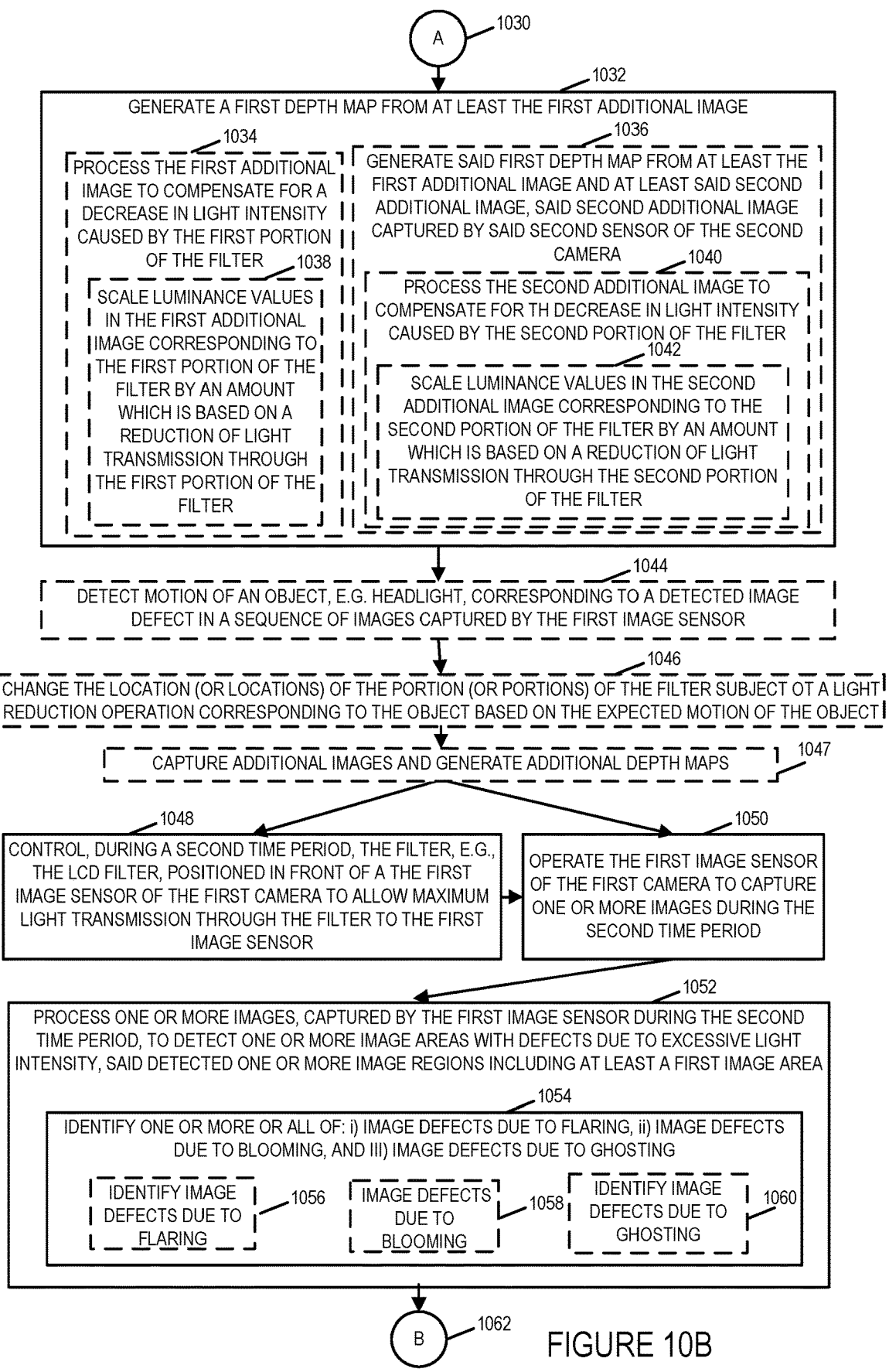
FIG. 10B shows a second part of a flow chart showing the steps of a second exemplary method implemented in accordance with some embodiments of the invention.

FIG. 10, which comprises the combination of FIGS. 10A, 10B and 10C, shows the steps of a second exemplary method embodiment which can be and sometimes is implemented using the system shown in FIG. 6 with one or more of the components of the system such as the cameras and LC panel being as shown in the other figures in greater detail.

The method 1000 begins in start step 1002 with a system such as the system shown in FIG. 6 being powered on. Operation proceeds from step 1002 to steps 1004 which, like step 1006, relates to camera operation during a first time period. In step 1004 a controllable filter, e.g., LC panel 104 positioned in front a first image sensor, e.g., sensor 606, of a first camera, e.g., camera 108, is controlled to allow maximum light transmission through the filter 104 to the first image sensor 606. In step 1006 the first image sensor is operated to capture one or more images during the first time period, i.e., while the filter 104 is allowing the maximum possible amount of light through. Operation proceeds from step 1006 to step 1008 in which the one or more images captured in step 1006 while the filter 104 was set for maximum light transmission are processed to detect one or more image regions in the capture image or images with defects due to excessive light intensity. In some embodiments one or more of steps 1012, 1014 and 1016 are identified. In step 1012 one or more image defects due to flaring are identified and the location of the defects in the image and thus the corresponding portion of the image sensor which captured the image are identified. In step 1014 one or more image defects due to blooming are identified and the location of the defects in the image and thus the corresponding portion of the image sensor which captured the image are identified. In step 1016 one or more image defects due to ghosting are identified, and the location of the object in the image that was the source of the ghosting is identified and thus the corresponding portion of the image sensor which was subject to high intensity light which caused the ghosting effect is identified. Note that the location of the source object will be different from the location of the ghost object. Thus in the case of ghosting, filtering may be applied to a location which is different from the location where the ghost occurred. Similarly in the case of blooming, the area at the center of the bloom may be the area of high light intensity which causes the bloom and will be the target of filtering with optimally a portion of the bloom extending out from the high intensity area also being subject to filtering to eliminate or reduce the bloom.

With image defects and there location with respect to the sensor used to capture images having been determined in step 1008 operation proceeds to steps 1018 and optionally step 1024. In step 1018 the filter 104 is controlled to reduce light transmission by a first amount through a first portion of the filter 104 corresponding to a first portion of the first image sensor used to capture a portion of the environment corresponding to a first image region which corresponds to one of the identified defects identified in step 1008. Filtering of other sensor regions corresponding to additional detected defects can be and sometimes is also implemented in step 1018. Accordingly, in step 1018 one or more sensor regions which correspond to identified defects are filtered or in the case of ghosting the sensor area which where the object causing the ghosting is captured is subject to filtering to reduce or eliminate the ghosting. Operation proceeds from step 1018 in which regional filtering is implemented using filter 104, with the amount of filtering be optimized on a per region basis when a region corresponds to a detected image defect, to step 1020. In step 1020 at least a first additional image is captured at a first time, e.g., a time in which the regional filtering implemented in step 1018 is being applied by filter 104. Step 1020 in some embodiments includes step 1022 in which the first camera 108 is used the first additional image.

A filter 106 and corresponding second camera 110 including sensor 608 are operated in parallel to the first camera in some embodiments as shown in steps 1024 and 1026. In this way multiple filters and cameras can be controlled in parallel to capture images that can be used for depth map generation purposes. In step 10024 the second filter 106 is controlled to reduce light transmission through a portion of the second filter 106 used to capture a portion of the environment corresponding to an image region, e.g., the first image region, corresponding to a location where an image defect was detected. Then, with regional based filtering applied by the second filter 106 based on detected image defects, operation proceeds to step 1026 where a second camera 110 is used to capture a second additional image using a second image sensor 608. Step 1026 includes in some embodiments step 1028 in which a second additional image is captured by the second camera 110 at the same time the first additional image is captured. In some embodiments the system includes multiple cameras 110 in addition to the first camera 108.

Optionally additional cameras, e.g., cameras the same as camera 220, may be and sometimes are used to capture images for depth map generation. Such other cameras and their corresponding filters may be and sometimes are controlled based on the detected image defects identified in step 1008 with the image capture being performed parallel with the image capture by the first and second cameras.

Operation proceeds from steps 1020 and 1026 to step 1032 of FIG. 10B via connecting node 1030. In step 1032 the images captured in parallel in step 1020 and 1036 are processed taking into consideration the regionally applied filtering and potentially the exposure times used by different cameras. In step 1032 a first depth map is generated from at least the first additional image but normally from a set of images captured in parallel, e.g., the first additional image and the second additional image. Other images captured by other cameras may and sometime are also used in step 1032.

In various embodiments step 1032 includes steps 1034 and/or step 1036. In step 1034 the first additional image is processed to compensate for a decrease in light intensity caused by the regional filtering applied by filter 104, e.g., at least the filtering applied by the first portion of the filter 104. Step 1034 includes in some embodiments step 1038 which is a pixel normalization operation where the pixel values generated by sensor 51 606 and included in the first additional image that were subject to filtering are normalized. This involves in some embodiment scaling the luminance values corresponding to a filtered image portion as a function of the amount of filtering that was applied to reduce light transmission. In some embodiments the normalization operation may also involve adjustment of pixel values in the first additional image to compensate for different exposure times used by sensors of different cameras so that the normalized pixel values of different images can be compared, i.e., matched as part of the depth map generation process performed in step 1032.

In step 1036 the pixel first depth map is generated from multiple images, e.g., at least the first additional image and the second additional image. In step 1036, in step 1040 the second additional image is processed to compensate for the decrease in light intensity caused to one or more regions by the second filter 106. Step 1040 includes scaling step 1042 wherein pixel values in the second additional image are scaled as a function of the amount of regional filtering applied by the second filter 106 as part of a pixel normalization process. In step 1042 the additional second image pixel values may be and sometime are normalized as a function of the exposure time used by the second camera 110 which may be different from the exposure time used by camera 108. When the depth map is generated from multiple images in step 1040, the normalization step 1038 will have been applied to the pixel values of the first image prior to matching to the normalized pixel values of the second additional image as part of generating the first depth map.

While a depth map may be generated based on a set of images captured during one time period, multiple sequential images may be and sometimes are captured and used for generating different depth maps before the defect detection step, e.g., step 1008, is used again to adjust the amount of filtering to be applied to different pixel regions of the camera sensors to avoid or reduce luminosity related image defects. Motion of an object causing a defect in a sequence of captured images is detected in step 1044 and used to predict a change in where filtering should be applied from one frame time, e.g., image capture time, to the next frame time, e.g., image capture time. The detect motion of the object causing the defect maybe due to movement of the object, e.g., headlight causing the defect, or motion of the camera capturing the image. Camera motion maybe due to a vehicle 602 in which the camera is mounted moving. In either case of motion of the object or camera, or a combination of both the object and camera moving, the object causing the motion will appear to be moving from one captured frame to the next. The object motion in a capture sequence is predicted in step 1044 and the filtering is then adjusted accordingly in step 1046 prior to capture of additional images used for generating another depth map. Thus as a car with camera's moves, in some embodiments the filtering by the filters 104, 106 will be changed based on the expected location of an object, e.g., headlight, causing an image defect.

In step 1046 the location or location of the portion or portions of the camera sensor 606 and/or 608 subject to a light reduction filtering operation are changed based on the expected location of the object due to motion (object motion, camera motion or combination of the two) from one frame time to another.

Once the filters 104, 106 are modified to take into account expected motion and the change of object locations, from one frame time to the next, additional images are captured in step 1047 by the first and second cameras 108, 110 and additional depth maps are generated from the additional images.

After generation of depth maps based on images captured during a period of time in which object motion is compensated for, operation proceeds to steps 1048 through steps 1076 in which the previously described steps 1004 through 1032 are essentially repeated but for a new time period to allow for filter adjustments/recalibration due to motion or environmental changes.

In step 1048 a controllable filter, e.g., LC panel 104 positioned in front a first image sensor, e.g., sensor 606, of a first camera, e.g., camera 108, is controlled to allow maximum light transmission through the filter 104 to the first image sensor 606 during a second time period. In step 1050 the first image sensor is operated to capture one or more images during the second time period, i.e., while the filter 104 is allowing the maximum possible amount of light through. Operation proceeds from step 1050 to step 1052 in which the one or more images captured in step 1050 while the filter 104 was set for maximum light transmission are processed to detect one or more image regions in the capture image or images with defects due to excessive light intensity. In some embodiments one or more of steps 1056, 1058 and/or 1060 are performed as part of step 1052. In step 1056 one or more image defects due to flaring are identified and the location of the defects in the image and thus the corresponding portion of the image sensor which captured the portions of the image with the defects are identified. In step 1058 one or more image defects due to blooming are identified and the location of the defects in the image and thus the corresponding portion of the image sensor which captured the image are identified. In step 1060 one or more image defects due to ghosting are identified, and the location of the object in the image that was the source of the ghosting is identified and thus the corresponding portion of the image sensor which was subject to high intensity light which caused the ghosting effect is identified. Note that the location of the source object will be different from the location of the ghost object. Thus in the case of ghosting, filtering maybe applied to a location which is different from the location where the ghost occurred. Similarly in the case of blooming, the area at the center of the bloom maybe the area of high light intensity which causes the bloom and will be the target of filtering with optimally a portion of the bloom extending out from the high intensity area also being subject to filtering to eliminate or reduce the bloom.

With image defects and there location with respect to the sensor used to capture images having been determined in step 1052 operation proceeds to steps 1064 and optionally step 1070. In step 1064 the filter 104 is controlled to reduce light transmission by a second amount through a third portion of the filter 104 corresponding to a portion of the first image sensor used to capture a portion of the environment corresponding to a first image area which corresponds to one of the identified defects identified in step 1054. Filtering of other sensor regions corresponding to additional detected defects can be and sometimes is also implemented in step 1064. Accordingly, in step 1064 one or more sensor regions which correspond to identified defects are filtered or in the case of ghosting the sensor area which where the object causing the ghosting is captured is subject to filtering to reduce or eliminate the ghosting. Operation proceeds from step 1064 in which regional filtering is implemented using filter 104, with the amount of filtering be optimized on a per region basis when a region corresponds to a detected image defect, to step 1066. In step 1066 another image is captured following the second time period, e.g., during a period of time in which the filtering implemented in step 1064 is being applied. Step 1066 in some embodiments includes step 1068 in which the first camera 108 is used to capture the another image.

A filter 106 and corresponding second camera 110 including sensor 608 is operated in parallel to the first camera in some embodiments as shown in steps 1070 and 1072. In this way multiple filters and cameras can be controlled in parallel to capture images that can be used for depth map generation purposes. In step 1070 the second filter 106 is controlled to reduce light transmission through a fourth portion of the second filter 106 used to capture a portion of the environment corresponding to an image region, e.g., the first image region, corresponding to a location where an image defect was detected. Then, with regional based filtering applied by the second filter 106 based on detected image defects, operation proceeds to step 1072 where a second camera 110 is used to capture a second additional image using a second image sensor 608. Step 1072 includes in some embodiments step 1074 in which a third image is captured by the second camera 110 at the same time the another image is captured by the first camera.

Optionally additional cameras maybe and sometime are used to capture images for depth map generation. Such other cameras and their corresponding filters maybe and sometimes are controlled based on the detected image defects identified in step 1054 with the image capture being performed in parallel with the image capture by the first and second cameras.

Operation proceeds from steps 1066 and 1072 to step 1076. In step 1076 the images captured in parallel in step 1066 and 1076 are processed taking into consideration the regionally applied filtering and potentially the exposure times used by different cameras. In step 1076 a first depth map is generated from at least the first another image but normally from a set of images captured in parallel, e.g., the another image and the third image. Other images captured by other cameras may and sometime are also used in step 1076.

In various embodiments step 1076 includes steps 1078 and/or step 1080. In step 1078 the another image is processed to compensate for a decrease in light intensity caused by the regional filtering applied by filter 104, e.g., at least the filtering applied by the third portion of the filter 104. Step 1078 includes in some embodiments step 1082 which is a pixel normalization operation where the pixel values generated by sensor 51 606 and included in the another image that were subject to filtering are normalized. This involves in some embodiment scaling the luminance values corresponding to a filtered image portion as a function of the amount of filtering that was applied to reduce light transmission. In some embodiments the normalization operation may also involve adjustment of pixel values in the first additional image to compensate for different exposure times used by sensors of different cameras so that the normalized pixel values of different images can be compared, i.e., matched as part of the depth map generation process performed in step 1076.

In step 1080 the second depth map is generated from multiple images, e.g., at least the another image and the third additional image. In step 1080, in step 1084 the third image is processed to compensate for the decrease in light intensity caused to one or more regions by the second filter 106. Step 1084 includes scaling step 1086 wherein pixel values in the third image are scaled, as a function of the amount of regional filtering applied by the second filter 106, as part of a pixel normalization process. In step 1086 the additional second image pixel values maybe and sometime are normalized as a function of the exposure time used by the second camera 110 which maybe different from the exposure time used by camera 108. When the depth map is generated from multiple images in step 1076, the normalization step 1082 will have been applied to the pixel values of the additional image prior to matching to the normalized pixel values of the third image as part of generating the second depth map.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

While various figures show different exemplary methods, it should be appreciated that any of the methods can be implemented using the system, apparatus and/or components shown in any of the other figures in this application which include one or more components required to implement the illustrated method.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

Various exemplary numbered embodiments will now be discussed.

Exemplary Numbered Method Embodiments

Method Embodiment 1. A method involving image capture, the method comprising: controlling (1004), during a first time period, a filter (103) positioned in front of a first image sensor (606) of a first camera (108) (e.g., in front of the camera lens 610) to allow maximum light transmission through the filter (103) to the first image sensor (606); processing (1008) one or more images captured during the first time period by the first image sensor (606) to detect one or more image regions with defects due to excessive light intensity (e.g., image regions 177' and/or 181' subject to defects due to light from the headlight 175), said detected one or more image regions including at least a first image region; controlling (1018) the filter (103) to reduce light transmission by a first amount through a first portion (191) of the filter (103) corresponding to a portion (191') of the first image sensor (606) used to capture a portion of an environment corresponding to the first image region (e.g., image region subject to a defect due to headlight 175); and capturing (1020) at least a first additional image at a first time while the light transmission through the first portion (191) of the filter (103) is reduced by the first amount (e.g., where the first time is after the first time period).

Method Embodiment 1a. The method of Method Embodiment 1, wherein said filter (103) is a liquid crystal display (LCD) filter.

Method Embodiment 1b. The method of Method Embodiment 1a, wherein each pixel of the LCD filter is individually controlled and wherein said first portion (191) includes a single pixel or less than four pixels.

Method Embodiment 1c. The method of Method Embodiment 1, wherein said first additional image is captured by the first image sensor (606) of the first camera (108).

Method Embodiment 1A. The method of Method Embodiment 1, wherein processing (1008) one or more images captured during the first time period by the image sensor (606) to detect one or more image regions with defects due to excessive light intensity includes: identifying (1010) one, more or all of: i) image defects due to flaring, ii) image defects due to blooming; and iii) image defects due to ghosting.

Method Embodiment 2. The method of Method Embodiment 1, further comprising: generating (1032) a first depth map from at least the first additional image (in various embodiments generating the first depth map (753) includes using one or more additional images captured by other cameras (110) at the same time the first additional image is captured in addition to the first additional image to generate the first depth map (753), said one or more additional images being captured by additional cameras (110) positioned at known distances from said first camera (108) with one or more of the additional cameras being potentially behind different portions of said filter (103 or 104) (e.g., LCD filter)).

Method Embodiment 3. The method of Method Embodiment 2, wherein generating (1032) the first depth map (753) from at least the first additional image includes: processing (1034) the first additional image to compensate for a decrease in light intensity caused by the first portion (191) of the filter (103).

Method Embodiment 4. The method of Method Embodiment 3, wherein generating (1032) a first depth map (753) from at least the first additional image includes: generating (1036) said first depth map (753) from at least the first additional image and at least a second additional image captured by a second image sensor (608) of a second camera (110).

Method Embodiment 4A. The method of Method Embodiment 4, further comprising: capturing (1028), using the second camera (110), said second additional image at the same time said first additional image is captured.

Method Embodiment 4B. The method of Method Embodiment 4A, further comprising: controlling (1024) the first filter (103) to reduce light transmission by the first amount through a second portion (197) of the filter (103)

corresponding to a portion (197') of the second image sensor (608) used to capture the portion of the environment (e.g., portion where the headlight 175 is located) corresponding to the first image region (e.g., the headlight 175 region or other bright object region which caused the detected image defect).

Method Embodiment 4C. The method of Method Embodiment 4B, wherein generating (1036) the first depth map (753) from at least the first additional image and the second additional image further includes: processing (1400) the second additional image to compensate for the decrease in light intensity caused by the second portion (197) of the filter (103).

Method Embodiment 4D. The method of Method Embodiment 4, wherein luminance values corresponding to at least some portions of the first additional image and the second additional image which do not correspond to filter portions (191, 197) which were controlled to reduce light transmission are not adjusted as part of generating the first depth map (753).

Method Embodiment 5. The method of Method Embodiment 4, wherein processing (1034) the first additional image to compensate for the decrease in light intensity caused by the first portion (191) of the filter (103) includes scaling (1038) luminance values in the first additional image corresponding to the first portion (191) of the filter (103) by an amount which is based on the reduction of light transmission through the first portion (191) of the filter (103) (e.g. multiply the luminance values of pixels corresponding to the first portion by an amount which is inversely proportional to the amount of light transmission reduction by the first portion (191) of the filter (103).

Method Embodiment 6. The method of Method Embodiment 5, wherein processing (1008) one or more images captured during the first time period by the first image sensor (606) to detect one or more image regions with defects due to excessive light intensity includes: identifying (1010) one, more or all of: i) image defects due to flaring, ii) image defects due to blooming; and iii) image defects due to ghosting.

Method Embodiment 7. The method of Method Embodiment 6, further comprising: detecting (1044) motion of an object (e.g. headlight 175) corresponding to a detected image defect in a sequence of images captured by the first image sensor (606); and changing (1046) which portion (191, 192, 197, or 198) of the filter (103) is subject to a light reduction operation corresponding to the object based on the expected motion of the object (e.g., shift the position of the filtering corresponding to the object based on expected motion within the captured frames so that the filtering will occur at the expected position of the object, e.g., headlight. Consider for example switching filtering form segment 191 to 192 and switch filtering from segment 197 to 198 when motion of an object causing image defects due to high light intensity is from left to right in the field of view of the camera or cameras, e.g., in the direction from segment 191 to segment 192).

Method Embodiment 8. The method of Method Embodiment 6, further comprising: controlling (1048) the filter (103) positioned in front of the first image sensor (606) of the first camera (108) (e.g., in front of the camera lens 610) during a second time period to allow maximum light transmission through the filter (103 or 104) to the first image sensor (606); processing (1052) one or more images captured by the first image sensor (606) during the second time period to detect one or more image areas (note that it should be appreciated that the areas may be the same or different from the previously determined regions with defects) with defects due to excessive light intensity, said one or more image areas including at least a third image area; controlling (1064) the filter (103) to reduce light transmission by a second amount through a third portion (192) of the filter (103) corresponding to a portion (192') of the first image sensor (606) used to capture a portion of an environment corresponding to the third image area based on an image defect detected in an image captured during said second time period; and capturing (1066) another image following said second time period while the light transmission through the third portion (192) of the filter (103) is reduced by the second amount.

Method Embodiment 9. The method of Method Embodiment 8, further comprising: generating (1076) a second depth map (755) from said another image following said second time period while the light transmission through the third portion (109) of the filter (103) is reduced by the second amount (in various embodiments generating the second depth map (755) includes using one or more additional images captured by other cameras (e.g., additional cameras which are the same as camera 110 or similar to camera 110) t the same time the another image is captured in addition to the another image to generate the depth map, e.g. with the different images being captured by different cameras operating in parallel).

Method Embodiment 10. The method of Method Embodiment 1, wherein said filter (103) is a liquid crystal display (LCD) filter positioned at least one centimeter in front of a first lens (610) of the first camera (108); wherein each pixel of the LCD filter (103) is individually controlled; and wherein said first additional image is captured by the first image sensor (606) of the first camera (108).

Exemplary Numbered System Embodiments

System Embodiment 11. An image capture system (600 or 700), comprising: a first camera (108); a controllable light filter (103) positioned in front of a first image sensor (606) of a first camera (108); and a processor (604) configured to: control (1004), during a first time period, a filter (103) positioned in front of the first camera (108) (e.g., in front of the camera lens 610) to allow maximum light transmission through the filter (103) to a first image sensor (606) included in the first camera (108); process (1008) one or more images captured during the first time period by the first image sensor (606) to detect one or more image regions with defects due to excessive light intensity, said detected one or more image regions including at least a first image region; control (1018) the controllable light filter (103) to reduce light transmission by a first amount through a first portion (191) of the filter (103) corresponding to a portion (191') of the first image sensor (606) used to capture a portion of an environment corresponding to the first image region; and capture (1020) at least a first additional image at a first time while the light transmission through the first portion (191) of the filter (103) is reduced by the first amount.

System Embodiment 11a. The system of System Embodiment 11, wherein said filter (103) is a liquid crystal display (LCD) filter.

System Embodiment 11b. The system of System Embodiment 11a, wherein each pixel of the LCD filter (103) is individually controlled.

System Embodiment 11c. The system of System Embodiment 11, wherein said first additional image is captured by the first image sensor (606) of the first camera (108).

System Embodiment 11A. The system of System Embodiment 11, wherein processing (1008) one or more images captured during the first time period by the image sensor (606) to detect one or more image regions with defects due to excessive light intensity includes: operating the processor to identify (1010) one, more or all of: i) image defects due to flaring, ii) image defects due to blooming; and iii) image defects due to ghosting.

System Embodiment 12. The system of System Embodiment 11, wherein the processor (604) is further configured to: generate (1032) a first depth map (753) from at least the first additional image (in various embodiments generating the first depth map (753) includes using one or more additional images captured by other cameras at the same time the first additional image is captured in addition to the first additional image to generate the depth map, said one or more additional images being captured by additional cameras positioned at known distances from said first camera (108) with one or more of the additional cameras (110) being potentially behind different portions (191, 192, 197 or 198) of said filter (103).

System Embodiment 13. The system of System Embodiment 12, wherein generating (1032) a first depth map (753) from at least the first additional image includes: processing (1034) the first additional image to compensate for a decrease in light intensity caused by the first portion (191) of the filter (103).

System Embodiment 14. The system of System Embodiment 12, further comprising: a second camera (110) including a second image sensor (608).

System Embodiment 14AA. The system of System Embodiment 14, wherein the processor (604) is configured, as part generating (1032) a first depth map (753) from at least the first additional image to: generate (1036) said first depth map (753) from at least the first additional image and at least a second additional image captured by a second image sensor (608) of a second camera (110).

System Embodiment 14A. The system of System Embodiment 14, wherein the processor (604) is further configured to control the second camera (110) to: capture said second additional image at the same time said first additional image is captured.

System Embodiment 14B. The system of System Embodiment 14A, wherein the processor (604) is further configured to: control (1024) the controllable light filter (103) to reduce light transmission by the first amount through a second portion (197) of the filter (103) corresponding to a portion (197') of the second image sensor (608) used to capture the portion of the environment corresponding to the first image region (e.g., the headlight 175 or other bright object which caused the detected image defect).

System Embodiment 14C. The system of System Embodiment 14B, wherein the processor (604) is configured, as part of generating (1036) the first depth map (753) from at least the first additional image and the second additional image to: process (1400) the second additional image to compensate for the decrease in light intensity caused by the second portion (197) of the filter (103).

System Embodiment 14D. The system of System Embodiment 14, wherein luminance values corresponding to at least some portions of the first additional image and the second additional image which do not correspond to controllable light filter portions which were controlled to reduce light transmission are not adjusted as part of generating the first depth map (753).

System Embodiment 15. The systems of System Embodiment 14, wherein the processor (604) is configured, as part of processing (1034) the first additional image to compensate for the decrease in light intensity caused by the first portion (191) of the filter (103) to: scale (1038) luminance values in the first additional image corresponding to the first portion (191) of the filter (103) by an amount which is a based on the reduction of light transmission through the first portion (191) of the filter (103) (e.g. multiply the luminance values of pixels corresponding to the first portion (191) by an amount which is inversely proportional to the amount of light transmission reduction by the first portion (191) of the filter (103).

System Embodiment 16. The system of System Embodiment 15, wherein the processor (604) is configured as part of processing one or more images captured during the first time period by the first image sensor (606) to detect one or more image regions with defects due to excessive light intensity by performing the steps of: identifying (1010) one, more or all of: i) image defects due to flaring, ii) image defects due to blooming; and iii) image defects due to ghosting.

System Embodiment 17. The system of System Embodiment 16, wherein the processor is further configured to: detect (1044) motion of an object (e.g., headlight 175) corresponding to a detected image defect in a sequence of images captured by the first image sensor (606); and change (1046) the location of the portion of the filter (103) subject to a light reduction operation corresponding to the object based on the expected motion of the object (e.g., shift the position of the filtering corresponding to the object based on expected motion within the captured frames so that the filtering will occur at the expected position of the object, e.g., headlight 175).

System Embodiment 18. The system of System Embodiment 16, wherein the processor (604) is further configured to: control (1048) the controllable light filter (103) positioned in front of the first image sensor (606) of the first camera (108) (e.g., in front of the camera lens 610) during a second time period to allow maximum light transmission through the filter (103) to the first image sensor (606); process (1052) one or more images captured by the first image sensor (606) during the second time period to detect one or more image areas (note that it should be appreciated that the areas may be the same or different from the previously determine regions with defects) with defects due to excessive light intensity, said one or more image areas including at least a third image area; control (1064) the controllable light filter (103) to reduce light transmission by a second amount through a third portion (192) of the controllable light filter (103) corresponding to a portion of the first image sensor (606) used to capture a portion of an environment corresponding to the third image area based on an image defect detected in an image captured during said second time period said first (191), second (197) and third (192) portions of the controllable light filter (103) being different portions; and control the first image sensor (606) to capture (1066) another image following said second time period while the light transmission through the third portion (192) of the filter (103) is reduced by the second amount.

System Embodiment 19. The system of System Embodiment 18, wherein the processor (604) is further configured to: generate (1076) a second depth map (755) from said another image following said second time period while the light transmission through the third portion (192) of the filter (103) is reduced by the second amount (in various embodiments generating the second depth map (755) includes using one or more additional images captured by other cameras (110) at the same time the another image is captured in addition to the another image to generate the depth map, e.g. with the different images being captured by different cameras (110) operating in parallel).

System Embodiment 20. The method of System Embodiment 11, wherein said filter (103) is a liquid crystal display (LCD) filter positioned at least one centimeter in front of a first lens (610) of the first camera (108); wherein each pixel of the LCD filter (103) is individually controlled by the processor (604); and wherein said first additional image is captured by the first image sensor (606) of the first camera (108).

Numerous variations on the above described method sand apparatus are possible. In some embodiments system includes a light filtering mechanism outside of a lens-sensor assembly that can control the amount of light impinging on the sensor in a fine-grained manner, e.g., down to the level of a resolution of individual pixels or a small group of pixels, e.g., 5 or fewer pixels in some cases. In at least some embodiments a liquid crystal panel covers the field-of-view of a camera or set of cameras such that individual pixels of the panel can be controlled to manipulate the amount of light that affects a given region on the image sensor of an individual camera.

A controller implements a control mechanism used to control pixels on a filter, e.g., liquid crystal panel or panels and the amount of light that reaches one or more positions of a camera sensor or camera sensors.

The controller performs one or more of the following:

Acquire frame data such that the liquid-crystals across the entire LC panel allow as much light to pass through as possible. The method of controlling the LC panel may an sometimes does depend on the configuration of the panel being used—e.g. if parallel polarizers or cross polarizers are used on either of the liquid crystals Optionally, acquire an additional one or more frames such that the liquid crystals allow a fraction of the light to pass through Perform image capture optimization—Given the above two steps, any other scene data (e.g., motion of the camera, motion of the objects), the size of the entrance pupil (that is, the size of the image of the physical aperture as seen from the front of the lens) and the distance and orientation of the LC panel w.r.t. to the image sensor, optimize for the image sensor exposure settings to be used along with the liquid-crystal pixel potentials to be applied. The optimization is performed to increase the SNR per pixel while avoiding saturated or image sensor pixels not receiving enough light.

Although an optimization process can and sometimes does jointly optimize for the exposure and LC pixel potentials, with regard to various embodiments for the sake of clarity when explaining various aspects of the invention, the control of pixel potentials will now be discussed assuming that the image sensor exposure settings have been fixed.

Unlike for a pinhole camera model, the lens entrance pupil in some embodiments has non-zero size. Because of this, in addition to the LC pixels occupying the portion of the field-of-view (with respect to a pinhole at entrance pupil location) corresponding to a bright object, LC pixels on the periphery of this part of the FOV (Field Of View) also should be controlled so as not to saturate pixels on the image sensor. The thickness of this periphery around a bright object to be controlled is of the order of the size of the entrance pupil in LC pixel units. This also means that the distance of the LC panel from the camera is a factor in the system design in some embodiments. In fact, the greater the distance is between the panel and the camera, the larger the ratio of the LC pixels in the pinhole based span of the object to the pixels in the entrance pupil based periphery of this span. In the extreme case, if the panel were to be placed right on top of camera (entrance pupil, e.g., aperture), the entrance pupil covers the entire LC panel essentially giving little local control on the amount of light entering the camera. Accordingly, in at least some embodiments there are two or more millimeters of separation between the entrance papal of the camera and the LC panel over the entrance papal with one or more centimeters of spacing in some embodiments, e.g., with 3 or more centimeters of spacing, between the LC panel and entrance papal of a camera in some embodiments.

In embodiments where are used for a depth perception system, e.g., a system where distances to objects from the camera are determined and/or a depth map of an area captured in images captured by the camera, the exposure, and LC-based control can be and sometimes are exercised independently on the participating cameras of a set of cameras included in the system. However, during a pixel matching step implemented as part of depth estimation and/or camera map generation, pixel values are normalized based on the exposure settings of the sensor in conjunction with the pixel-wise potential applied on the LC panel, e.g., the captured pixel value are adjusted based on exposure time if the cameras used different exposure and the amount of light filtering applied to individual pixels, e.g., pixel sensors which generate pixel values from received light, as part of the image capture process. In some embodiments the pixel value normalization process takes into consideration the respective potential values across the LC pixels that affect a given image sensor pixel.

In some embodiments calibration procedures are used to associate the LC pixels with those on the sensor.

In various embodiments the removal lens flares is not explicit but achieved as a side-effect of blocking out light that would have otherwise led to saturation or blooming on the sensor.

Apart from blocking out light from light sources such as, e.g., sun, street lamps, headlights, the LC panel control can and sometimes is also used to maximize the SNR in shadows in scenes—e.g., by blocking out light in bright areas and then increasing the sensor exposure to gather more light for darker regions.

The exemplary method and apparatus are illustrates and described in an embodiment including a LCD panel to control the amount out light, exemplary methods and apparatus, in accordance with the present invention are not restricted to an LCD panel to control the amount of light. Any other means that allows for per-pixel granularity of control on the amount of light let in will suffice, and may be used.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use. In some embodiments such cameras are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method involving image capture, the method comprising:
   controlling, during a first time period, a filter positioned in front of a first image sensor of a first camera to allow maximum light transmission through the filter to the first image sensor;
   processing one or more images captured during the first time period by the first image sensor to detect one or more image regions with defects due to excessive light intensity, said detected one or more image regions including at least a first image region;
   controlling the filter to reduce light transmission by a first amount through a first portion of the filter corresponding to a portion of the first image sensor used to capture a portion of an environment corresponding to the first image region; and
   capturing at least a first additional image at a first time while the light transmission through the first portion of the filter is reduced by the first amount;
   generating a first depth map from at least the first additional image; and
   wherein said step of generating a first depth map from at least the first additional image includes processing the first additional image to compensate for a decrease in light intensity caused by the first portion of the filter.

2. The method of claim 1, wherein said filter is a liquid crystal display (LCD) filter.

3. The method of claim 1, wherein processing one or more images captured during the first time period by the first image sensor to detect one or more image regions with defects due to excessive light intensity includes:
   identifying one, more than one, or all of: i) image defects due to flaring, ii) image defects due to blooming; and iii) image defects due to ghosting.

4. The method of claim 1, wherein generating a first depth map from at least the first additional image includes:
   generating said first depth map from at least the first additional image and at least a second additional image captured by a second image sensor of a second camera.

5. The method of claim 4, wherein processing the first additional image to compensate for the decrease in light intensity caused by the first portion of the filter includes scaling luminance values in the first additional image corresponding to the first portion of the filter by an amount which is based on the reduction of light transmission through the first portion of the filter.

6. The method of claim 5, wherein processing one or more images captured during the first time period by the first image sensor to detect one or more image regions with defects due to excessive light intensity includes:
   identifying one, more or all of: i) image defects due to flaring, ii) image defects due to blooming; and iii) image defects due to ghosting.

7. The method of claim 6, further comprising:
   detecting motion of an object corresponding to a detected image defect in a sequence of images captured by the first image sensor; and
   changing which portion of the filter is subject to a light reduction operation corresponding to the object based on the expected motion of the object.

8. The method of claim 6, further comprising:
   controlling the filter positioned in front of the first image sensor of the first camera during a second time period to allow maximum light transmission through the filter to the first image sensor;
   processing one or more images captured by the first image sensor during the second time period to detect one or more image areas with defects due to excessive light intensity, said one or more image areas including at least a third image area;
   controlling the filter to reduce light transmission by a second amount through a third portion of the filter corresponding to a portion of the first image sensor used to capture a portion of an environment corresponding to the third image area based on an image defect detected in an image captured during said second time period; and
   capturing another image following said second time period while the light transmission through the third portion of the filter is reduced by the second amount.

9. The method of claim 8, further comprising:
   generating a second depth map from said another image following said second time period while the light transmission through the third portion of the filter is reduced by the second amount.

10. The method of claim 1,
    wherein said filter is a liquid crystal display (LCD) filter positioned at least one centimeter in front of a first lens of the first camera;
    wherein each pixel of the LCD filter is individually controlled; and
    wherein said first additional image is captured by the first image sensor of the first camera.

11. A system, comprising:
    a first camera;
    a controllable light filter positioned in front of a first image sensor of the first camera; and
    a processor configured to:
    control, during a first time period, a filter positioned in front of the first camera to allow maximum light transmission through the filter to a first image sensor included in the first camera;
    process one or more images captured during the first time period by the first image sensor to detect one or more image regions with defects due to excessive light intensity, said detected one or more image regions including at least a first image region;
    control the controllable light filter to reduce light transmission by a first amount through a first portion of the filter corresponding to a portion of the first image sensor used to capture a portion of an environment corresponding to the first image region;
    control capture of at least a first additional image at a first time while the light transmission through the first portion of the filter is reduced by the first amount; and generate a first depth map from at least the first additional image, said generating a first depth map including processing the first additional image to compensate for a decrease in light intensity caused by the first portion of the filter.

12. The system of claim 11, wherein said filter is a liquid crystal display (LCD) filter.

13. The system of claim 11, wherein the processor is configured to:
identify one, more than one, or all of: i) image defects due to flaring, ii) image defects due to blooming; and iii) image defects due to ghosting as part of being configured to process one or more images captured during the first time period by the image sensor to detect one or more image regions with defects due to excessive light intensity.

14. The system of claim 11, further comprising:
a second camera including a second image sensor.

15. The system of claim 14, wherein the processor is configured, as part of processing the first additional image to compensate for the decrease in light intensity caused by the first portion of the filter to:
scale luminance values in the first additional image corresponding to the first portion of the filter by an amount which is a based on the reduction of light transmission through the first portion of the filter by an amount which is inversely proportional to the amount of light transmission reduction by the first portion of the filter.

16. The system of claim 15, wherein the processor is configured as part of processing one or more images captured during the first time period by the first image sensor to detect one or more image regions with defects due to excessive light intensity, to:
identify one, more or all of: i) image defects due to flaring, ii) image defects due to blooming; and iii) image defects due to ghosting.

17. The system of claim 16, wherein the processor is further configured to:
detect motion of an object corresponding to a detected image defect in a sequence of images captured by the first image sensor; and
change the location of the portion of the filter subject to a light reduction operation corresponding to the object based on the expected motion of the object.

18. The system of claim 16, wherein the processor is further configured to:
control the controllable light filter positioned in front of the first image sensor of the first camera during a second time period to allow maximum light transmission through the filter to the first image sensor;
process one or more images captured by the first image sensor during the second time period to detect one or more image areas with defects due to excessive light intensity, said one or more image areas including at least a third image area;
control the controllable light filter to reduce light transmission by a second amount through a third portion of the controllable light filter corresponding to a portion of the first image sensor used to capture a portion of an environment corresponding to the third image area based on an image defect detected in an image captured during said second time period said first, second and third portions of the controllable light filter being different portions; and
control the first image sensor to capture another image following said second time period while the light transmission through the third portion of the filter is reduced by the second amount.

19. The system of claim 18, wherein the processor is further configured to:
generate a second depth map from said another image following said second time period while the light transmission through the third portion of the filter is reduced by the second amount.

20. The system of claim 11,
wherein said filter is a liquid crystal display (LCD) filter positioned at least one centimeter in front of a first lens of the first camera;
wherein each pixel of the LCD filter is individually controlled by the processor; and
wherein said first additional image is captured by the first image sensor of the first camera.

* * * * *